(12) United States Patent
Durrani et al.

(10) Patent No.: US 12,335,132 B2
(45) Date of Patent: Jun. 17, 2025

(54) VIRTUAL GATEWAYS IN A CLOUD EXCHANGE

(71) Applicant: Equinix, Inc., Redwood City, CA (US)

(72) Inventors: Muhammad Durrani, San Jose, CA (US); Rizwan Jamal, San Jose, CA (US); David McCullough, San Jose, CA (US); Muhammad Zeeshan Nasir Syed, San Jose, CA (US); Mithun Thai Valaphil, Santa Clara, CA (US); Sudhanva Gnaneshwar, Livermore, CA (US); Vivek Bansal, Fremont, CA (US)

(73) Assignee: Equinix, Inc., Redwood City, CA (US)

( * ) Notice: Subject to any disclaimer, the term of this patent is extended or adjusted under 35 U.S.C. 154(b) by 0 days.

(21) Appl. No.: 17/321,229

(22) Filed: May 14, 2021

(65) Prior Publication Data

US 2021/0359948 A1 Nov. 18, 2021

Related U.S. Application Data

(60) Provisional application No. 63/025,352, filed on May 15, 2020.

(51) Int. Cl.
*H04L 12/66* (2006.01)
*H04L 45/02* (2022.01)
(Continued)

(52) U.S. Cl.
CPC .............. *H04L 45/02* (2013.01); *H04L 12/66* (2013.01); *H04L 47/20* (2013.01); *H04L 67/10* (2013.01)

(58) Field of Classification Search
CPC .......... H04L 47/20; H04L 12/66; H04L 67/10
See application file for complete search history.

(56) References Cited

U.S. PATENT DOCUMENTS 8,612,612 B1 * 12/2013 Dukes ................... H04L 67/141
  709/203
9,032,077 B1 * 5/2015 Klein ....................... H04L 47/00
  712/30

(Continued)

FOREIGN PATENT DOCUMENTS

CA  2951940 A1  10/2016
CN  107948098 A  *  4/2018

(Continued)

OTHER PUBLICATIONS

Rosen et al., "BGP/MPLS IP Virtual Private Networks (VPNs)," Network Working Group, RFC 4364, The Internet Society, Feb. 2006, 47 pp.

(Continued)

*Primary Examiner* — Shean Tokuta
(74) *Attorney, Agent, or Firm* — Shumaker & Sieffert, P.A.

(57) ABSTRACT

In an example, a system includes a first cloud exchange network for a first cloud exchange, the first cloud exchange network located within a first data center and configured with a first dedicated virtual gateway, the first dedicated virtual gateway configured to interface with a first virtual connector to a customer network, with a second virtual connector to a first cloud service provider (CSP) network, and with a third virtual connector to a second CSP network. Network traffic among the customer network, the first CSP network, and the second CSP network is routed through the first dedicated virtual gateway. The first dedicated virtual gateway dynamically polices the network traffic based on an aggregate bandwidth subscription configured in the first cloud exchange network that limits a total bandwidth that may be used over the first cloud exchange network between (Continued)

the customer network, the first CSP network, and the second CSP network.

16 Claims, 8 Drawing Sheets

(51) Int. Cl.
    *H04L 47/20*          (2022.01)
    *H04L 67/10*          (2022.01)

(56) References Cited

U.S. PATENT DOCUMENTS

| | | | | |
|---|---|---|---|---|
| 9,154,589 | B1* | 10/2015 | Klein | H04L 41/0896 |
| 9,306,870 | B1* | 4/2016 | Klein | H04L 47/783 |
| 9,497,139 | B2* | 11/2016 | Klein | H04L 47/808 |
| 9,886,267 | B2 | 2/2018 | Maheshwari et al. | |
| 9,948,552 | B2 | 4/2018 | Teng et al. | |
| 9,983,860 | B1* | 5/2018 | Koty | H04L 67/10 |
| 10,097,478 | B2* | 10/2018 | To | H04L 47/528 |
| 10,129,078 | B2 | 11/2018 | Kumar et al. | |
| 10,250,562 | B1* | 4/2019 | Srinath | H04L 63/0209 |
| 10,275,416 | B1* | 4/2019 | Felbinger | G06Q 30/0631 |
| 10,382,266 | B1 | 8/2019 | Balakrishnan et al. | |
| 10,523,631 | B1 | 12/2019 | Wagner | |
| 10,819,630 | B1 | 10/2020 | Panchal et al. | |
| 10,846,788 | B1* | 11/2020 | Klein | H04L 47/83 |
| 10,878,483 | B1 | 12/2020 | Felbinger, II et al. | |
| 2006/0071776 | A1* | 4/2006 | White | H04B 3/546 |
| | | | | 340/538 |
| 2007/0002771 | A1* | 1/2007 | Berkman | H04B 3/542 |
| | | | | 370/257 |
| 2007/0058632 | A1* | 3/2007 | Back | H04L 43/00 |
| | | | | 370/392 |
| 2007/0286079 | A1* | 12/2007 | Mollenkopf | H04B 3/542 |
| | | | | 340/310.11 |
| 2007/0294395 | A1* | 12/2007 | Strub | H04L 12/1439 |
| | | | | 709/224 |
| 2008/0106241 | A1* | 5/2008 | Deaver | H02J 3/1828 |
| | | | | 323/209 |
| 2008/0143491 | A1* | 6/2008 | Deaver | H04B 3/542 |
| | | | | 370/463 |
| 2008/0291915 | A1* | 11/2008 | Foschiano | H04L 63/1441 |
| | | | | 370/392 |
| 2011/0276951 | A1* | 11/2011 | Jain | G06F 11/301 |
| | | | | 718/1 |
| 2012/0185586 | A1* | 7/2012 | Olshansky | H04L 47/20 |
| | | | | 709/224 |
| 2013/0227670 | A1* | 8/2013 | Ahmad | H04L 63/20 |
| | | | | 709/217 |
| 2014/0013321 | A1* | 1/2014 | Laoutaris | G06F 9/5072 |
| | | | | 718/1 |
| 2015/0006755 | A1* | 1/2015 | Turlington | H04L 47/326 |
| | | | | 709/233 |
| 2015/0058474 | A1* | 2/2015 | Bloom | H04L 47/2425 |
| | | | | 709/224 |
| 2015/0081948 | A1* | 3/2015 | Thereska | G06F 3/061 |
| | | | | 711/103 |
| 2015/0263987 | A1* | 9/2015 | Klein | H04L 47/808 |
| | | | | 709/226 |
| 2016/0127454 | A1* | 5/2016 | Maheshwari | H04L 67/10 |
| | | | | 709/223 |
| 2016/0218971 | A1* | 7/2016 | Basunov | H04L 45/04 |
| 2016/0308762 | A1* | 10/2016 | Teng | H04L 12/4633 |
| 2016/0337474 | A1* | 11/2016 | Rao | H04L 41/5025 |
| 2017/0012831 | A1* | 1/2017 | Felbinger | G06Q 10/00 |
| 2017/0093702 | A1* | 3/2017 | Teng | H04L 12/4633 |
| 2018/0083882 | A1* | 3/2018 | Krishan | H04L 41/0894 |
| 2018/0098104 | A1* | 4/2018 | Duddles | H04L 67/02 |
| 2018/0131770 | A1 | 5/2018 | Doraiswamy et al. | |
| 2018/0205648 | A1* | 7/2018 | Hsu | H04L 47/20 |
| 2019/0007270 | A1* | 1/2019 | Suragi Math | H04L 41/5003 |
| 2019/0182213 | A1* | 6/2019 | Saavedra | H04L 63/0218 |
| 2020/0029249 | A1* | 1/2020 | Livanos | H04W 8/02 |
| 2020/0153719 | A1* | 5/2020 | Chauhan | H04L 67/02 |
| 2021/0288910 | A1* | 9/2021 | Daly | H04L 47/24 |
| 2021/0359948 | A1* | 11/2021 | Durrani | H04L 67/10 |

FOREIGN PATENT DOCUMENTS

| | | | | |
|---|---|---|---|---|
| CN | 110636123 A | | 12/2019 | |
| CN | 110808919 A | * | 2/2020 | |
| EP | 1705839 A1 | * | 9/2006 | H04L 12/462 |
| EP | 2892183 A1 | * | 7/2015 | H04L 12/4633 |
| EP | 3605968 A1 | * | 2/2020 | H04L 12/66 |
| JP | 2017098605 A | * | 6/2017 | |
| WO | WO-2005115085 A2 | * | 12/2005 | H04L 12/5695 |
| WO | WO-2016183253 A1 | * | 11/2016 | H04L 12/4633 |
| WO | WO-2021231964 A1 | * | 11/2021 | H04L 12/66 |

OTHER PUBLICATIONS

"Example: Grouping Source and Destination Prefixes into a Forwarding Class," TechLibrary, Juniper Networks, Aug. 30, 2017, 15 pp.
International Search Report and Written Opinion of International Application No. PCT/US2021/032605, mailed Sep. 15, 2021, 13 pp.
International Preliminary Report on Patentability from International Application No. PCT/US2021/032605, dated Nov. 24, 2022, 10 pp.
Response to Communication Pursuant to Rules 161(1) and 162 EPC dated Dec. 22, 2022, from counterpart European Application No. 21730423.7, filed Jun. 30, 2023, 85 pp.
First Examination Report from counterpart Australian Application No. 2021273280 dated Jun. 29, 2023, 3 pp.
Notice of Intent to Grant from counterpart Australian Application No. 2021273280 dated Jun. 14, 2024, 3 pp.
Response to First Examination Report dated Jun. 29, 2023, from counterpart Australian Application No. 2021273280 filed Jun. 4, 2024, 25 pp.
First Office Action and Search Report, and translation thereof, from counterpart Chinese Application No. 202180049004.7 dated Aug. 28, 2024, 18 pp.

* cited by examiner

VIRTUAL GATEWAYS IN A CLOUD EXCHANGE

This application claims the benefit of U.S. provisional application No. 63/025,352 filed May 15, 2020, the entire content of which is incorporated herein by reference.

TECHNICAL FIELD

The disclosure relates to computer networks and, more specifically, to cloud exchanges for cloud services.

BACKGROUND

Cloud computing refers to the use of dynamically scalable computing resources accessible via a network, such as the Internet. The computing resources, often referred to as a "cloud," provide one or more services to users. These services may be categorized according to service types, which may include for examples, applications/software, platforms, infrastructure, virtualization, and servers and data storage. The names of service types are often prepended to the phrase "as-a-Service" such that the delivery of applications/software and infrastructure, as examples, may be referred to as Software-as-a-Service (SaaS), Platform-as-a-Service (PaaS), and Infrastructure-as-a-Service (IaaS), respectively.

The term "cloud-based services" or, more simply, "cloud services" refers not only to services provided by a cloud, but also to a form of service provisioning in which cloud customers contract with cloud service providers for the online delivery of services provided by the cloud. Cloud service providers manage a public, private, or hybrid cloud to facilitate the online delivery of cloud services to one or more cloud customers.

SUMMARY

In general, this disclosure describes establishing one or more dedicated virtual gateways, for a customer, in one or more cloud exchanges to facilitate a service delivery model having a uniform method of managing bandwidth usage of network traffic for the customer for multiple virtual connections. A cloud exchange provider may offer and provide the service delivery model to the customer. In some examples, a virtual gateway is configured as a routing instance within one or more network devices of a cloud exchange. A cloud exchange provider administers cloud exchanges to, for example, facilitate virtual connections between multiple cloud service providers and the customer network, between customer networks for the customer that are located in different cloud exchanges, between cloud service provider networks for service traffic for the customer, and other virtual connections that transport network traffic attributable to the customer. The cloud exchange enables customers to request direct connections between multiple cloud service providers via dedicated routing instances operating at the cloud exchanges to bypass the public Internet. Connections between multiple service providers can allow, for example, customers to transfer large amounts of data between the cloud service providers. Generally, these cloud service providers establish bandwidth limitations on network traffic into and out of the cloud service provider's networks.

The dedicated virtual gateway for a cloud exchange facilitates managing and monitoring customer aggregate network traffic across a cloud exchange by establishing a single point of connection and management for customer traffic within the cloud exchange. The dedicated virtual gateway polices traffic through the dedicated virtual gateway based on the destination of the traffic. Accordingly, rather than the customer individually managing bandwidth usage per service provider network, the dedicated routing instance may be re-provisioned to balance bandwidth usage dynamically based on demand as network traffic between the customer network and the cloud service provider networks changes, both within the local cloud exchange having the virtual gateway and also between virtual gateways for the local cloud exchange and remote cloud exchanges. The techniques may facilitate dynamically and directly routing network traffic between the customer network and service provider networks and simplifies network resources required to manage network traffic in light of changing traffic patterns and cloud service provider bandwidth restrictions. The techniques may also enable a simplified Layer 3 service model for the cloud exchange provider in which a customer can request a single aggregate bandwidth that is then apportioned and rate-limited dynamically by the cloud exchange among multiple virtual connections, thereby improving the customer experience.

In an example, a system includes a first cloud exchange network for a first cloud exchange, the first cloud exchange network located within a first data center and configured with a first dedicated virtual gateway, the first dedicated virtual gateway configured to interface with a first virtual connector to a customer network, with a second virtual connector to a first cloud service provider network, and with a third virtual connector to a second cloud service provider network, wherein network traffic among the customer network, the first cloud service provider network, and the second cloud service provider network is routed through the first dedicated virtual gateway, and wherein the first dedicated virtual gateway dynamically polices the network traffic based on an aggregate bandwidth subscription configured in the first cloud exchange network that limits a total bandwidth that may be used over the first cloud exchange network between the customer network, the first cloud service provider network, and the second cloud service provider network.

In an example, a system includes a first cloud exchange network of a first cloud exchange, the first cloud exchange network located within a first data center and configured with a first dedicated virtual gateway storing a first route to a customer network; and a second cloud exchange network of a second cloud exchange, the second cloud exchange network located within a second data center geographically remote from the first data center, and configured with a second dedicated virtual gateway storing a second route a cloud service provider network, wherein the first dedicated virtual gateway polices network traffic over the first route based on a first aggregate bandwidth subscription configured in the first cloud exchange network and network traffic between the first dedicated virtual gateway and the second dedicated virtual gateway, and wherein second dedicated virtual gateway polices network traffic over the second route based on a second aggregate bandwidth subscription established by the second cloud exchange network and network traffic between the first dedicated virtual gateway and the second dedicated virtual gateway.

In an example, a method includes configuring, by a programmable network platform, a first dedicated virtual gateway in a first cloud exchange network located within a first data center, to interface with a first virtual connector to a customer network, with a second virtual connector to a first cloud service provider network, and with a third virtual connector to a second cloud service provider network, wherein network traffic among the customer network, the first cloud service provider network, and the second cloud service provider network is routed through the first dedicated virtual gateway; and dynamically policing, by the first dedicated virtual gateway, the network traffic based on an aggregate bandwidth subscription that limits a total bandwidth that may be used over the first cloud exchange network between the customer network, the first cloud service provider network, and the second cloud service provider network.

The details of one or more examples are set forth in the accompanying drawings and the description below. Other features, objects, and advantages will be apparent from the description and drawings, and from the claims.

BRIEF DESCRIPTION OF DRAWINGS

Like reference characters denote like elements throughout the figures and text.

DETAILED DESCRIPTION

Figure 1:
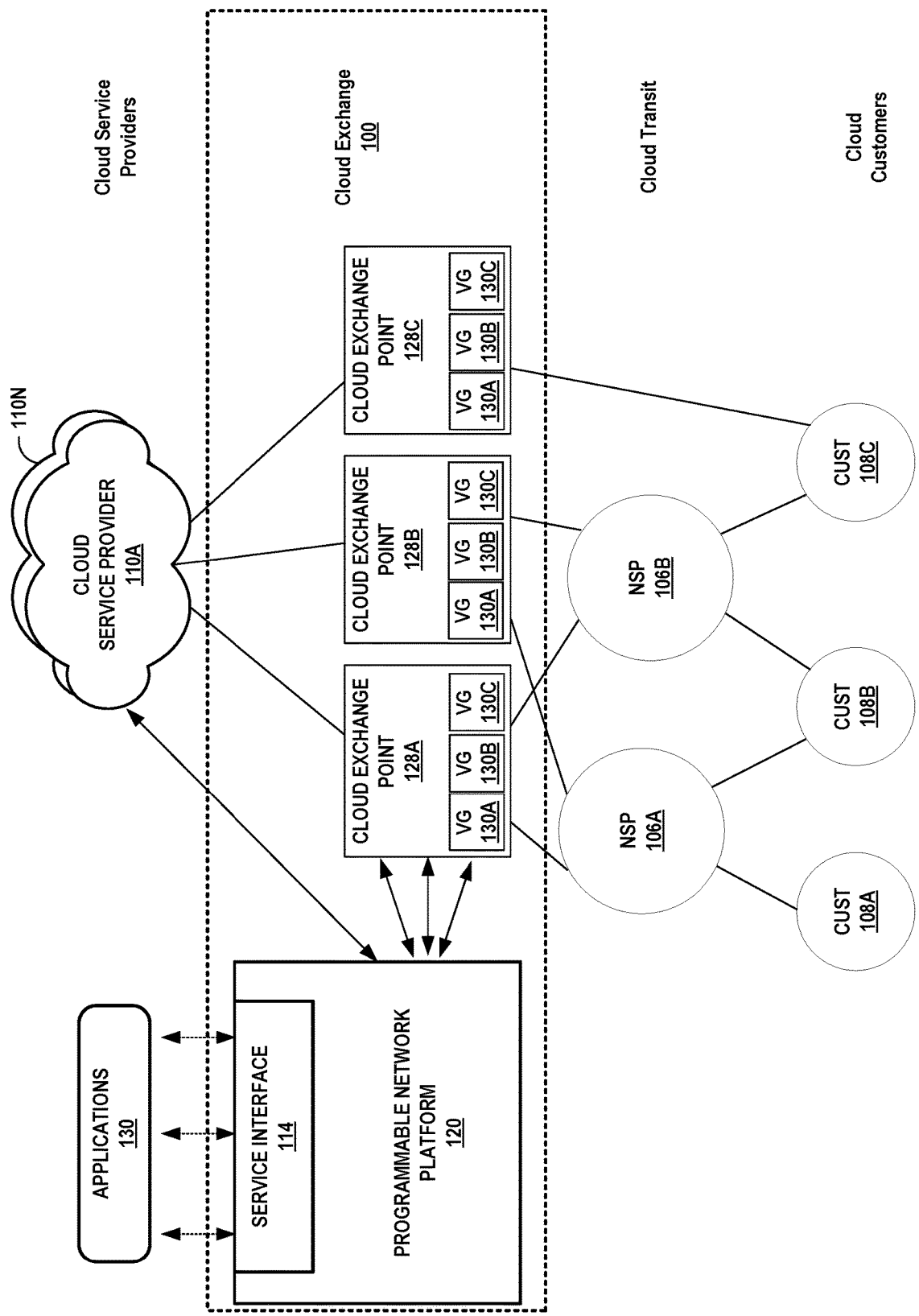
FIG. 1 is a block diagram that illustrates a conceptual view of a system having a metro-based cloud exchange that provides virtual gateways across multiple cloud exchange points according to techniques described herein.

A cloud exchange at a metro location includes a dedicated virtual gateway that serves as the routing instance for a customer at the cloud exchange. The dedicated virtual gateway routes network traffic related to the customer. For example, the dedicated virtual gateway routes network traffic between a cloud service provider and a colocated customer router. Instead of maintaining a physical connection per cloud service provider, the colocated customer router maintains a single connector to the dedicated virtual gateway configured as a routing instance on network devices of the cloud exchange. Through subscriptions, the dedicated virtual gateway maintains the connectors to one or more cloud service providers. "Customers" of the cloud exchange provider may include enterprises and cloud service providers.

When the customer is subscribed to cloud service providers and/or has equipment (e.g., edge metal, colocated router, etc.) at multiple cloud exchanges, a dedicated virtual gateway serves as the routing instance for a customer at that cloud exchange. The collection of virtual gateways at different cloud exchanges forms the network traffic backbone for the customer. The dedicated virtual gateways are interconnected such that traffic between the cloud exchanges is routed through the dedicated virtual gateways. The dedicated virtual gateways exchange routes automatically. Additionally, when a customer subscribes to a cloud service provider's service that is located at a new metro location, a dedicated virtual gateway is automatically provisioned for the customer at the corresponding cloud exchange and is added to the collection of dedicated virtual gateways for the customer.

In accordance with a unified subscription model for a customer of a cloud exchange provider, customers license network traffic per dedicated virtual gateway. This licensed traffic defines the maximum bandwidth, i.e., rate, that can be routed through the dedicated virtual gateway and therefore defines a total amount of licensed bandwidth available to the customer for all of its services. This licensed bandwidth may include traffic between the dedicated virtual gateways located at different cloud exchanges of different metropolitan areas. The dedicated virtual gateway then polices the traffic to ensure that the traffic between the dedicated virtual gateways and the cloud service providers does not exceed the bandwidth limit of the customer's subscription. This provides a single interface for the customer to monitor and manage bandwidth usage across all of the customer's subscriptions.

The dedicated virtual gateways may use destination-based rate limiting in which, for instance, network traffic is rate-limited to a set of one or more destinations. In some examples, the dedicated virtual gateway use destination class usage (DCU) to perform destination-based rate limiting. DCU counts packets from customers by performing lookups of the destination address. DCU makes it possible to track traffic originating from the customer, for instance, and destined for specific cloud service providers. This facilitates, for example, traffic shaping such that traffic destined for the cloud service provider does not exceed the customer's subscription and risk being dropped by the cloud service provider. By policing the aggregate traffic to the customer's destinations, the dedicated virtual gateway can ensure that the bandwidth of the aggregate traffic does not exceed the customer's licensed bandwidth. As used herein, aggregate/aggregated traffic may refer to traffic for a customer that is exchanged between a virtual gateway and multiple networks such that the traffic to/from the multiple networks is exchanged on a common connector with another network.

FIG. 1 is a block diagram that illustrates a conceptual view of a system having a metro-based cloud exchange that provides virtual gateways across multiple cloud exchange points according to techniques described herein. Each of cloud-based services exchange points 128A-128D (described hereinafter as "cloud exchange points" and collectively referred to as "cloud exchange points 128") of cloud-based services exchange 100 ("cloud exchange 100") may represent a different data center geographically located within the same metropolitan area ("metro-based," e.g., in New York City, New York; Silicon Valley, California; Seattle-Tacoma, Washington; Minneapolis-St. Paul, Minnesota; London, UK; etc.) to provide resilient and independent cloud-based services exchange by which cloud-based services customers ("cloud customers") and cloud-based service providers ("cloud providers") connect to receive and provide, respectively, cloud services. In various examples, cloud exchange 100 may include more or fewer cloud exchange points 128. In some instances, a cloud exchange 100 includes just one cloud exchange point 128. As used herein, reference to a "cloud exchange" or "cloud-based services exchange" may refer to a cloud exchange point. A cloud exchange provider may deploy instances of cloud exchanges 100 in multiple different metropolitan areas, each instance of cloud exchange 100 having one or more cloud exchange points 128.

Each of cloud exchange points 128 includes network infrastructure and an operating environment by which cloud customers 108A-108D (collectively, "cloud customers 108") receive cloud services from multiple cloud service providers 110A-110N (collectively, "cloud service providers 110"). Cloud exchange 100 provides customers of the exchange, e.g., enterprises, network carriers, network service providers, and SaaS customers, with secure, private, virtual connections to multiple cloud service providers (CSPs) globally. The multiple CSPs participate in the cloud exchange by virtue of their having at least one accessible port in the cloud exchange by which a customer can connect to the one or more cloud services offered by the CSPs, respectively. Cloud exchange 100 allows private networks of any customer to be directly cross-connected to any other customer at a common point, thereby allowing direct exchange of network traffic between the networks of the customers.

When connecting to cloud exchange, 100, CSPs 110 establish service profiles for customers 108 to subscribe to the services of CSPs 100. The service profiles are maintained by cloud exchange 100. The service profiles define, for example, rules and parameters associated with connection to CPSs 110 through cloud exchange 100. Additionally, service profiles specify one or more bandwidth limitations for customer 108 to select when subscribing to CSPs 110. As described below, cloud exchange 100 polices traffic between the subscribed CPSs 110 and customer 108 based on the selected bandwidth limitation in the service profile.

Cloud customers 108 may receive cloud-based services directly via a layer 3 peering and physical connection to one of cloud exchange points 128 or indirectly via one of network service providers 106A-106B (collectively, "NSPs 106," or alternatively, "carriers 106"). NSPs 106 provide "cloud transit" by maintaining a physical presence within one or more of cloud exchange points 128 and aggregating layer 3 access from one or customers 108. NSPs 106 may peer, at layer 3, directly with one or more cloud exchange points 128 and in so doing offer indirect layer 3 connectivity and peering to one or more customers 108 by which customers 108 may obtain cloud services from the cloud exchange 100. Each of cloud exchange points 128, in the example of FIG. 1, is assigned a different autonomous system number (ASN). For example, cloud exchange point 128A is assigned ASN 1, cloud exchange point 128B is assigned ASN 2, and so forth. Each cloud exchange point 128 is thus a next hop in a path vector routing protocol (e.g., BGP) path from cloud service providers 110 to customers 108. As a result, each cloud exchange point 128 may, despite not being a transit network having one or more wide area network links and concomitant Internet access and transit policies, peer with multiple different autonomous systems via external BGP (eBGP) or other exterior gateway routing protocol in order to exchange, aggregate, and route service traffic from one or more cloud service providers 110 to customers. In other words, cloud exchange points 128 may internalize the eBGP peering relationships that cloud service providers 110 and customers 108 would maintain on a pair-wise basis. Instead, a customer 108 may configure a single eBGP peering relationship with a cloud exchange point 128 and receive, via the cloud exchange, multiple cloud services from one or more cloud service providers 110. While described herein primarily with respect to eBGP or other layer 3 routing protocol peering between cloud exchange points and customer, NSP, or cloud service provider networks, the cloud exchange points may learn routes from these networks in other way, such as by static configuration, or via Routing Information Protocol (RIP), Open Shortest Path First (OSPF), Intermediate System-to-Intermediate System (IS-IS), or other route distribution protocol.

As examples of the above, customer 108C is illustrated as having contracted with a cloud exchange provider for cloud exchange 100 to directly access layer 3 cloud services via cloud exchange points 128C. In this way, customer 108C receives redundant layer 3 connectivity to cloud service provider 110A, for instance. Customer 108C, in contrast, is illustrated as having contracted with the cloud exchange provider for cloud exchange 100 to directly access layer 3 cloud services via cloud exchange point 128C and also to have contracted with NSP 106B to access layer 3 cloud services via a transit network of the NSP 106B. Customer 108B is illustrated as having contracted with multiple NSPs 106A, 106B to have redundant cloud access to cloud exchange points 128A, 128B via respective transit networks of the NSPs 106A, 106B. The contracts described above are instantiated in network infrastructure of the cloud exchange points 128 by L3 peering configurations within switching devices of NSPs 106 and cloud exchange points 128 and L3 connections, established within cloud exchange points 128 to interconnect cloud service provider 110 networks to NSPs 106 networks and customer 108 networks, all having at least one port offering connectivity within one or more of the cloud exchange points 128.

Cloud exchange points 128 are configured with dedicated virtual gateways 130A-130C (collectively "dedicated virtual gateways 130"). Dedicated virtual gateways 130 are virtual routing instances that are dedicated to network traffic of a specific customer 108. For example, dedicated virtual gateway 130A may be the destination for network traffic destined for customer 108A. Network traffic the customer network of customer 108A may be routed through dedicated virtual gateway 130A to CSPs 110. Cloud exchange 100 allows a corresponding one of customer customers 108A, 108B of any network service providers (NSPs) or "carriers" 106A-106B (collectively, "carriers 106") or other cloud customers including customers 108C to be connected, via their dedicated virtual gateway, to any other customer network and/or to any of CSPs 110. This allows an exchange of network traffic among the customer networks and CSPs 110 via dedicated virtual gateways 130 such that all network traffic flows through the dedicated virtual gateways 130. The connections may in some examples be IP-VPN or other types of attachment circuits and may be referred to herein as virtual connectors or simply connectors. The virtual connectors may connect a customer network to a virtual gateway, connect a cloud service provider network to a virtual gateway for a customer network, connect a virtual gateway for a customer network to a virtual gateway for a cloud service provider network, connect a virtual gateway for a customer in a first metro-based cloud exchange to a virtual gateway for the customer in a second, different metro-based cloud exchange, among other examples. Again, customers of the cloud exchange provider may include cloud service providers. Dedicated virtual gateways 130 may eliminate customer 108 establishing separate network profiles for L2 and L3 access. In some examples, dedicated virtual gateways 130 may provide L2 and L3 connections such that the types of virtual connectors between dedicated virtual gateways 130 and CSPs 110 are independent of the type of the virtual connectors between dedicated virtual gateways 130 and customer 108.

Generally, customers 108 have a subscription with cloud exchange 100 and with each CSP 110 to which the customer connects via cloud exchange 100. These subscriptions set forth a licensed traffic that can be used by customer 108. For examples, customers 108 license traffic per dedicated virtual gateway 130 in cloud exchange 100. This licensed traffic defines the maximum bandwidth (e.g., rate, etc.) that can be routed through the dedicated virtual gateway 130 and therefore defines a total amount of licensed bandwidth available to customer 108 for all network traffic to CSPs 100 through cloud exchange 100. Similarly, subscriptions to CSPs 110 may define maximum ingress and/or egress network traffic that customer 108 may use. Dedicated virtual gateways 130 provide a unified subscription model for a customer 108. Dedicated virtual gateways 130 monitor and manage (e.g., police, shape, etc.) network traffic for customer 108 at cloud exchange 100 accounting for the licensed traffic subscription to cloud exchange 100 and license traffic subscriptions to various CSPs 110. Dedicated virtual gateways 130 police network traffic to ensure that the traffic between dedicated virtual gateways 130 and the CSPs 110 does not exceed the bandwidth limit of the customer's subscription to CSPs 110. Dedicated virtual gateways 130 provides a single interface for customer 108 to monitor and manage bandwidth usage across all of the customer's subscriptions. In some examples, dedicated virtual gateways 130 facilitate CSP-to-CSP network traffic such that data from one CSP (e.g., CSP 110A) may be provided to another CSP (e.g., CSP 110N) without transit through the customer network. Dedicated virtual gateways 130 may dynamically provision network traffic to response to dynamically changing network usage while managing the network traffic in accordance with the subscriptions of customer 108. Dedicated virtual gateways 130 may be configured for a specific customer 108 across multiple cloud exchange points 128 within cloud exchange 100 such that network traffic is uniformly monitored and managed in accordance with the techniques of this disclosure regardless through which cloud exchange point 128 the network traffic is routed.

Carriers 106 may each represent a network service provider that is associated with a transit network by which network subscribers of the carrier 106 may access cloud services offered by CSPs 110 via the cloud exchange 100. In general, customers of CSPs 110 may include network carriers, large enterprises, managed service providers (MSPs), as well as Software-as-a-Service (SaaS), Platform-aaS (PaaS), Infrastructure-aaS (IaaS), Virtualization-aaS (VaaS), and data Storage-aaS (dSaaS) customers for such cloud-based services as are offered by the CSPs 110 via the cloud exchange 100.

In this way, cloud exchange 100 streamlines and simplifies the process of partnering CSPs 110 and customers (via carriers 106 or directly) in a transparent and neutral manner. One example application of cloud exchange 100 is a co-location and interconnection data center in which CSPs 110 and carriers 106 and/or customers 108 may already have network presence, such as by having one or more accessible ports available for interconnection within the data center, which may represent any of cloud exchange points 128. This allows the participating carriers, customers, and CSPs to have a wide range of interconnectivity options within the same facility. A carrier/customer may in this way have options to create many-to-many interconnections with only a one-time hook up to one or more cloud exchange points 128. In other words, instead of having to establish separate connections across transit networks to access different cloud service providers or different cloud services of one or more cloud service providers, cloud exchange 100 allows customers to interconnect to multiple CSPs and cloud services.

Cloud exchange 100 includes a programmable network platform 120 for dynamically programming cloud exchange 100 to responsively and assuredly fulfill service requests that encapsulate business requirements for services provided by cloud exchange 100 and/or cloud service providers 110 coupled to the cloud exchange 100. The programmable network platform 120 may, as a result, orchestrate a business-level service across heterogeneous cloud service providers 110 according to well-defined service policies, quality of service policies, service level agreements, and costs, and further according to a service topology for the business-level service.

The programmable network platform 120 enables the cloud service provider that administers the cloud exchange 100 to dynamically configure and manage the cloud exchange 100 to, for instance, facilitate virtual connections for cloud-based services delivery from multiple cloud service providers 110 to one or more cloud customers 108 through a dedicated virtual gateway 130. The cloud exchange 100 may enable cloud customers 108 to bypass the public Internet to connect to cloud service providers 110 through a dedicated virtual gateway 130 so as to improve performance, reduce costs, increase the security and privacy of the connections, and leverage cloud computing for additional applications. In this way, enterprises, network carriers, and SaaS customers, for instance, can at least in some aspects integrate cloud services with their internal applications as if such services are part of or otherwise directly coupled to their own data center network. Additionally, dedicated virtual gateways 130 may simplify management of traffic subscriptions of cloud exchange 100 and cloud service providers 110 by providing a single entity within cloud exchange 100 to monitor and manage network traffic.

Programmable network platform 120 may represent an application executing within one or more data centers of the cloud exchange 100, or alternatively, off-site at a back office or branch of the cloud provider (for instance). Programmable network platform 120 may be distributed in whole or in part among the data centers, each data center associated with a different cloud exchange point 128 to make up the cloud exchange 100. Although shown as administering a single cloud exchange 100, programmable network platform 120 may control service provisioning for multiple different cloud exchanges. Alternatively or additionally, multiple separate instances of the programmable network platform 120 may control service provisioning for respective multiple different cloud exchanges.

In the illustrated example, programmable network platform 120 includes a service interface (or "service API") 114 that defines the methods, fields, and/or other software primitives by which applications 130, such as a customer portal, may invoke the programmable network platform 120. The service interface 114 may allow carriers 106, customers 108, cloud service providers 110, and/or the cloud exchange provider programmable access to capabilities and assets of the cloud exchange 100 according to techniques described herein.

For example, the service interface 114 may facilitate machine-to-machine communication to enable dynamic provisioning of virtual connectors in the cloud exchange for interconnecting customer and/or cloud service provider networks. In this way, the programmable network platform 120 enables the automation of aspects of cloud services provisioning. For example, the service interface 114 may provide an automated and seamless way for customers to establish, de-install and manage interconnections among multiple, different cloud providers participating in the cloud exchange.

Further example details of a cloud-based services exchange can be found in U.S. patent application Ser. No. 15/099,407, filed Apr. 14, 2016 and entitled "CLOUD-BASED SERVICES EXCHANGE;" U.S. patent application Ser. No. 14/927,451, filed Oct. 29, 2015 and entitled "INTERCONNECTION PLATFORM FOR REAL-TIME CONFIGURATION AND MANAGEMENT OF A CLOUD-BASED SERVICES EXCHANGE;" U.S. patent application Ser. No. 14/927,306, filed Oct. 29, 2015 and entitled "ORCHESTRATION ENGINE FOR REAL-TIME CONFIGURATION AND MANAGEMENT OF INTERCONNECTIONS WITHIN A CLOUD-BASED SERVICES EXCHANGE;" and U.S. patent application Ser. No. 15/396,349, filed Dec. 30, 2016 and entitled "LAYER THREE INSTANCES FOR A CLOUD-BASED SERVICES EXCHANGE;" each of which are incorporated herein by reference in their respective entireties.

Figure 2:
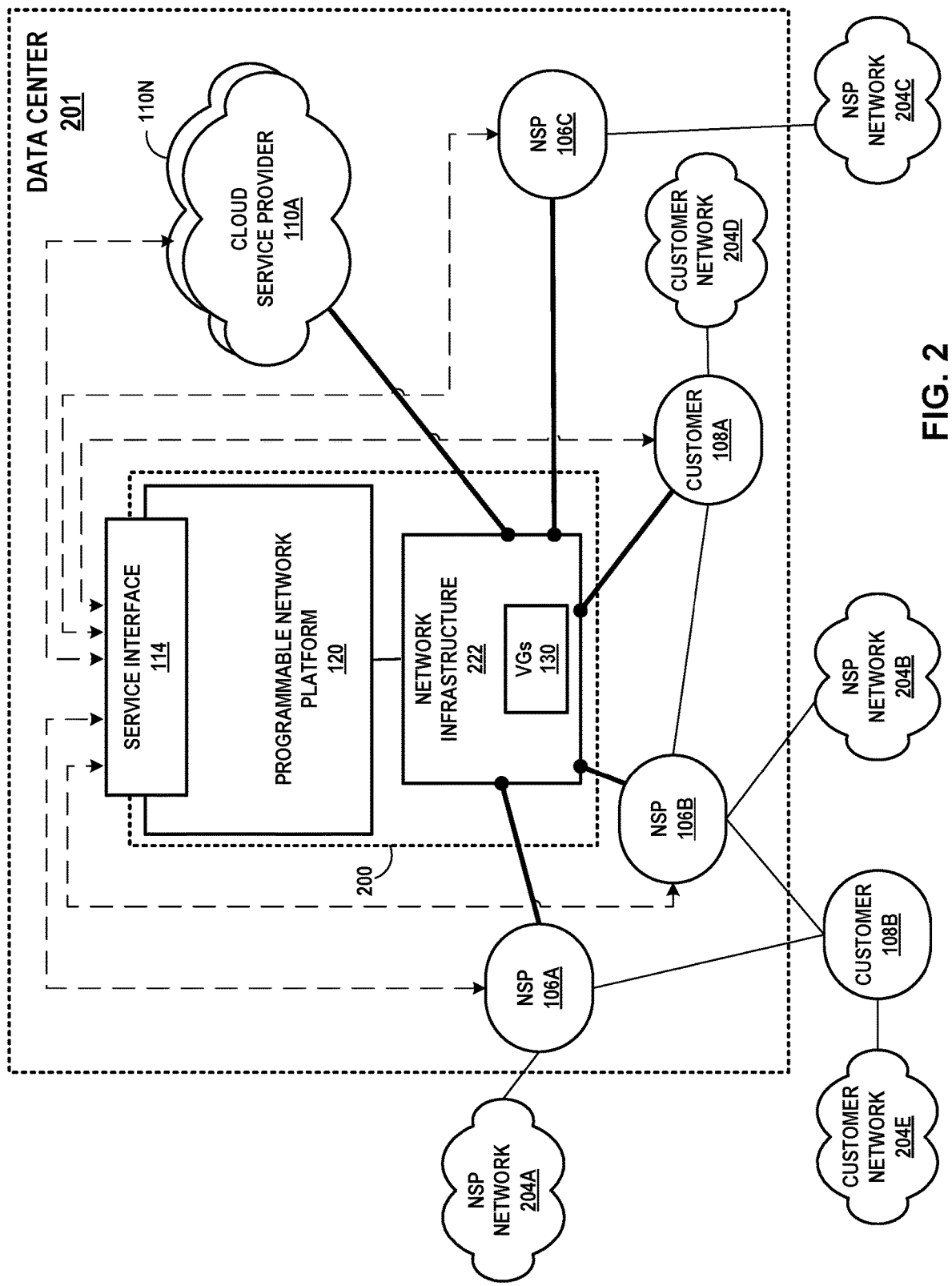
FIG. 2 is a block diagram illustrating a high-level view of a data center that provides an operating environment for a cloud-based services exchange, according to techniques described herein.

FIG. 2 is a block diagram illustrating a high-level view of a data center 201 that provides an operating environment for a cloud-based services exchange 200, according to techniques described herein. Cloud-based services exchange 200 ("cloud exchange 200") allows a corresponding one of customer networks 204D, 204E and NSP networks 204A-204C (collectively, "'private' or 'carrier' networks 204") of any NSPs 106A-106C or other cloud customers including customers 108A, 108B to be directly connected, via a dedicated virtual gateway 130 to any other customer network and/or to any of cloud service providers 110A-110N, thereby allowing exchange of cloud service traffic among the customer networks and/or CSPs 110. Data center 201 may be entirely located within a centralized area, such as a warehouse or localized data center complex, and provide power, cabling, security, and other services to NSPs, customers, and cloud service providers that locate their respective networks within the data center 201 (e.g., for co-location) and/or connect to the data center 201 by one or more external links.

Network service providers 106 may each represent a network service provider that is associated with a transit network by which network subscribers of the NSP 106 may access cloud services offered by CSPs 110 via the cloud exchange 200. In general, customers of CSPs 110 may include network carriers, large enterprises, managed service providers (MSPs), as well as Software-as-a-Service (SaaS), Platform-aaS (PaaS), Infrastructure-aaS (IaaS), Virtualization-aaS (VaaS), and data Storage-aaS (dSaaS) customers for such cloud-based services as are offered by the CSPs 110 via the cloud exchange 200.

In this way, cloud exchange 200 streamlines and simplifies the process of partnering CSPs 110 and customers 108 (indirectly via NSPs 106 or directly) in a transparent and neutral manner. Additionally, cloud exchange 200 facilitates managing, in a uniform manner, network traffic between CSPs 110 and customers 108 based on a unified subscription model for customers 108. One example application of cloud exchange 200 is a co-location and interconnection data center in which CSPs 110, NSPs 106 and/or customers 108 may already have network presence, such as by having one or more accessible ports available for interconnection within the data center. This allows the participating carriers, customers, and CSPs to have a wide range of interconnectivity options in the same facility.

Cloud exchange 200 of data center 201 includes network infrastructure 222 that provides a L2/L3 switching fabric by which CSPs 110 and customers/NSPs interconnect through dedicated virtual gateways 130 that route L2/L3 traffic. This enables an NSP/customer to have options to create many-to-many interconnections with only a one-time hook up to the switching network and underlying network infrastructure 222 that presents an interconnection platform for cloud exchange 200. In other words, instead of having to establish separate connections across transit networks to access different cloud service providers or different cloud services of one or more cloud service providers, cloud exchange 200 allows customers to interconnect to multiple CSPs and cloud services using network infrastructure 222 within data center 201 via a dedicated virtual gateway 130, which may represent any of the edge networks described in this disclosure, at least in part.

By using cloud exchange 200, customers can purchase services and reach out to many end users in many different geographical areas without incurring the same expenses typically associated with installing and maintaining multiple virtual connections with multiple CSPs 110. For example, NSP 106A can expand its services using network 204B of NSP 106B. By connecting to cloud exchange 200, an NSP 106 may be able to generate additional revenue by offering to sell its network services to the other carriers. For example, NSP 106C can offer the opportunity to use NSP network 204C to the other NSPs.

Cloud exchange 200 includes a programmable network platform 120 that exposes at least one service interface, which may include in some examples and are alternatively referred to herein as application programming interfaces (APIs), in that the APIs define the methods, fields, and/or other software primitives by which applications may invoke the programmable network platform 120. The software interfaces allow NSPs 206 and customers 108 programmable access to capabilities and assets of the cloud exchange 200. The programmable network platform 120 may alternatively be referred to as a controller, provisioning platform, provisioning system, service orchestration system, etc., for establishing end-to-end services including, e.g., connectivity between customers and cloud service providers according to techniques described herein.

On the buyer side, the software interfaces presented by the underlying interconnect platform provide an extensible framework that allows software developers associated with the customers of cloud exchange 200 (e.g., customers 108 and NSPs 206) to create software applications that allow and leverage access to the programmable network platform 120 by which the applications may request that the cloud exchange 200 establish connectivity between the customer and cloud services offered by any of the CSPs 110. For example, these buyer-side software interfaces may allow customer applications for NSPs and enterprise customers, e.g., to obtain authorization to access the cloud exchange, obtain information regarding available cloud services, obtain active ports and metro area details for the customer, create virtual connectors of varying bandwidth to access cloud services, including dynamic selection of bandwidth based on a purchased cloud service to create on-demand and need based virtual connectors to or between cloud service providers, delete virtual connectors, obtain active virtual connector information, obtain details surrounding CSPs partnered with the cloud exchange provider, obtain customized analytics data, validate partner access to interconnection assets, and assure service delivery.

On the cloud service provider seller side, the software interfaces may allow software developers associated with cloud providers to manage their cloud services and to enable customers to connect to their cloud services. For example, these seller-side software interfaces may allow cloud service provider applications to obtain authorization to access the cloud exchange, obtain information regarding available cloud services, obtain active ports and metro area details for the provider, obtain active port details in a given data center for the provider, approve or reject virtual connectors of varying bandwidth created by customers for the purpose of accessing cloud services, obtain virtual connectors pending addition and confirm addition of virtual connectors, obtain virtual connectors pending deletion and confirm deletion of virtual connectors, obtain customized analytics data, validate partner access to interconnection assets, and assure service delivery.

Service interface 114 facilitates machine-to-machine communication to enable dynamic service provisioning and service delivery assurance. In this way, the programmable network platform 120 enables the automation of aspects of cloud services provisioning. For example, the software interfaces may provide an automated and seamless way for customers to establish, de-install and manage interconnection with or between multiple, different cloud providers participating in the cloud exchange. The programmable network platform 120 may in various examples execute on one or virtual machines and/or real servers of data center 201, or off-site.

In the example of FIG. 2, network infrastructure 222 represents the cloud exchange switching fabric and includes multiple ports that may be dynamically interconnected with virtual connectors by, for example, invoking service interface 114 of the programmable network platform 120. Each of the ports is associated with one of carriers 106, customers 108, and CSPs 110.

In some examples, a cloud exchange seller (e.g., an enterprise or a CSP nested in a CSP) may request and obtain an L3 instance, and may then create a seller profile associated with the L3 instance, and subsequently operate as a seller on the cloud exchange. The techniques of this disclosure enable multiple CSPs to participate in an Enterprise's L3 instance (e.g., an L3 "routed instance" or L2 "bridged instance") without each CSP flow being anchored with an enterprise device.

In some aspects, the programmable network platform 120 may provision a cloud exchange to deliver services made up of multiple constituent services provided by multiple different cloud service providers, where this is provided via the L3 instance as a service described herein. Each of these constituent services is referred to herein as a "micro-service," in that it is part of an overall service applied to service traffic. That is, a plurality of micro-services may be applied to service traffic in a particular "arrangement," "ordering," or "topology," in order to make up an overall service for the service traffic. The micro-services themselves may be applied or offered by the cloud service providers 110.

When a customer 108 subscribes to cloud exchange 200 (e.g., establishes a direct or indirect connection and licenses bandwidth for traffic through cloud exchange 200, etc.), programmable network platform 120 may provision a virtual gateway 130 dedicated to customer 108 such that network traffic flowing to and originating from the port associated with customer 108 is routed through the corresponding dedicated virtual gateway 130. In some examples, virtual gateway 130 facilities a connection between networks of customers 108 and CSPs 100 when customer 108 does not have a physical port connection to network infrastructure. Virtual gateway 130 may facilitate customer 108 operating from a virtual port based on another entity's physical port.

Figure 3A:
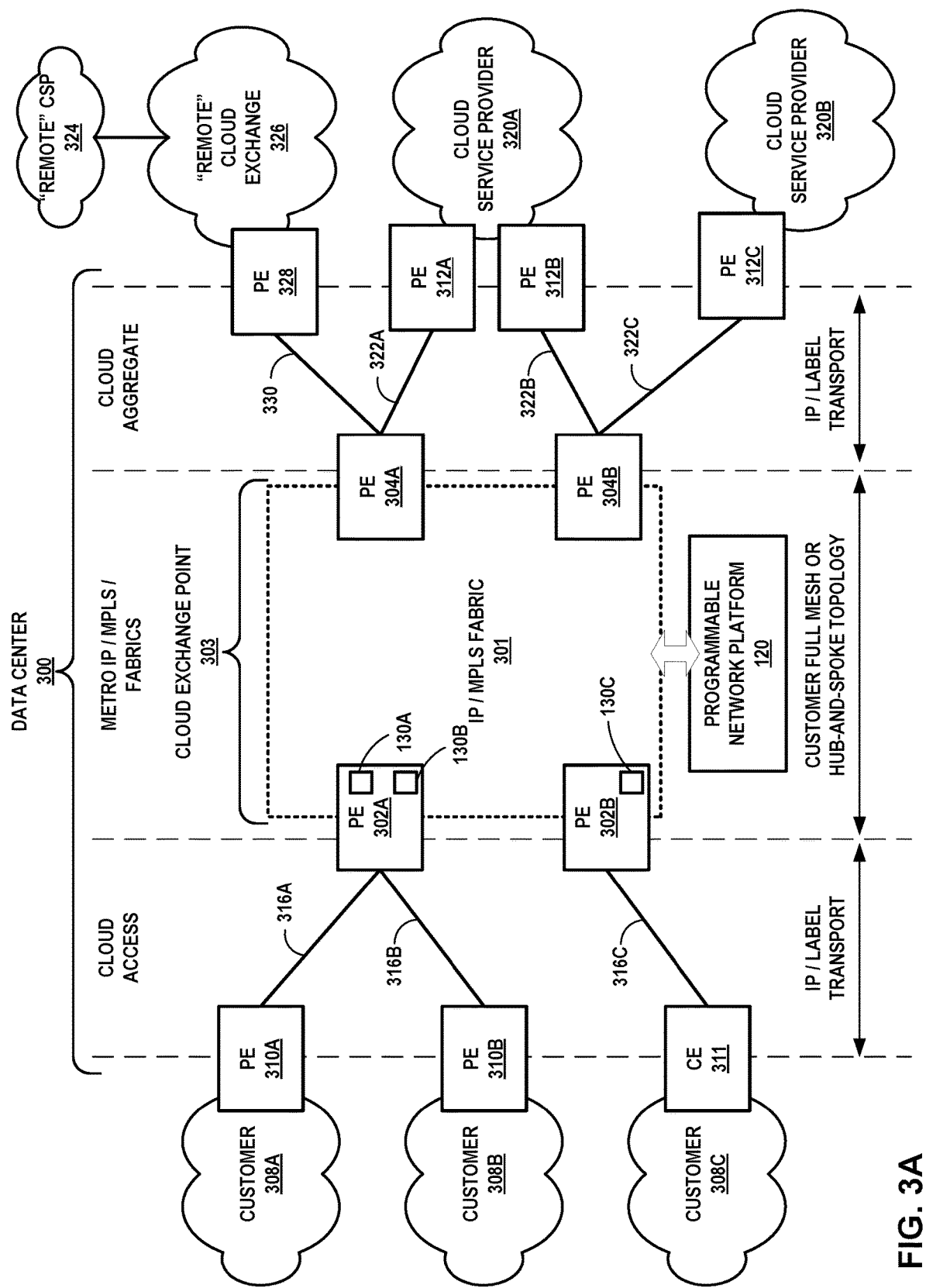
FIGS. 3A-3B are block diagrams illustrating example network infrastructure and service provisioning by a programmable network platform for a cloud exchange that aggregates bandwidth for virtual connections among multiple cloud service providers and customers of the cloud exchange provider, in accordance with techniques described in this disclosure.
Figure 3B:
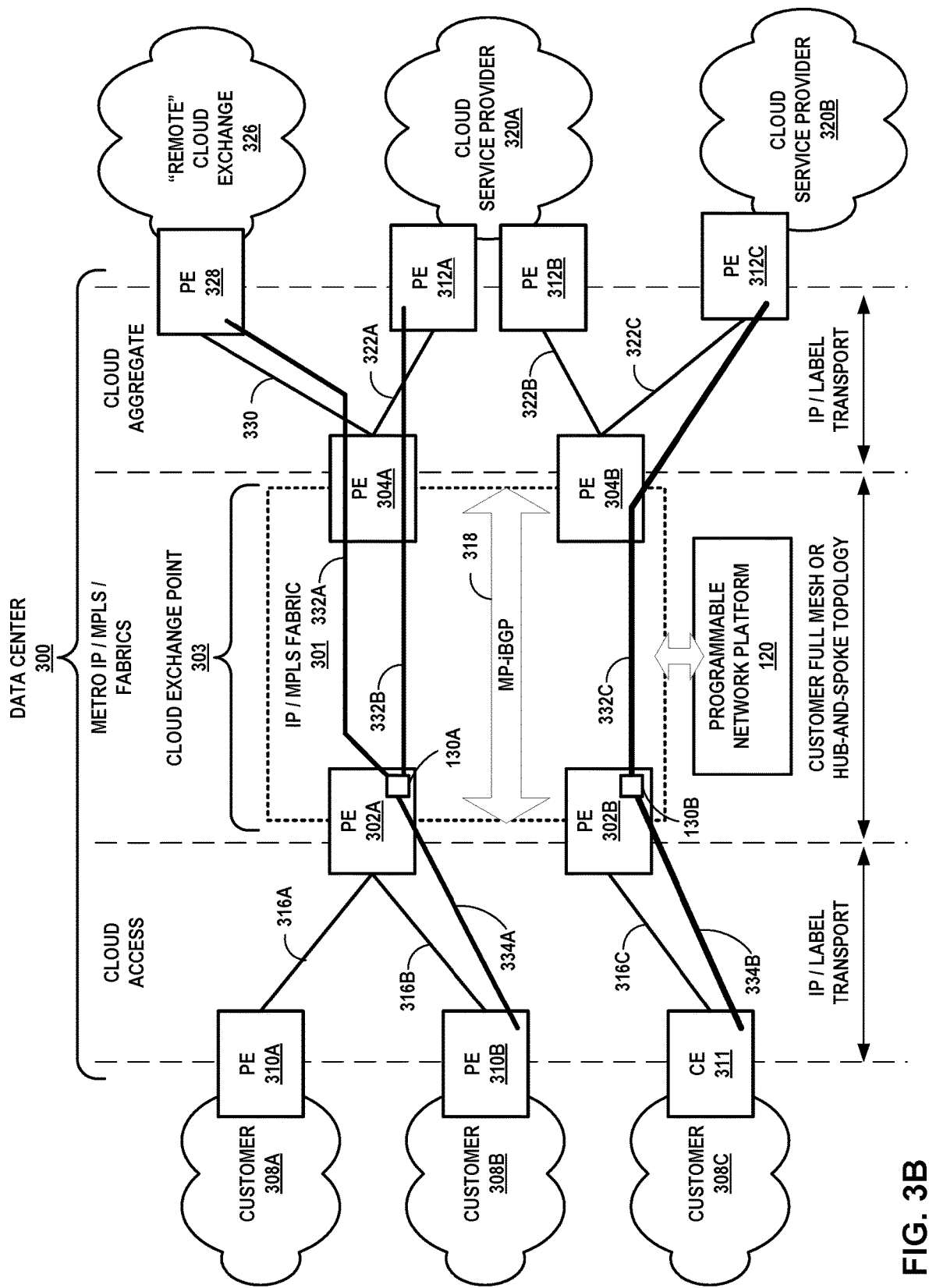

FIGS. 3A-3B are block diagrams illustrating example network infrastructure (e.g., network infrastructure 122 of FIG. 2) and by a programmable network platform for a cloud exchange that aggregates bandwidth shaping to multiple cloud service providers provisioned to customers of the cloud exchange provider, in accordance with techniques described in this disclosure. In this example, customer networks 308A-308C (collectively, "customer networks 308"), each associated with a different customer, access a cloud exchange point within a data center 300 in order receive aggregated cloud services from one or more cloud service provider networks 320, each associated with a different cloud service provider 110. Additionally, in some examples, customer networks 308 may access a cloud exchange point within a data center 300 in order receive aggregated cloud services from one or more remote cloud service provider networks 324 that are directly connected to a remote cloud exchange 326 (e.g., a cloud exchange operating at a different data center). In some examples, customer networks 308 each include endpoint devices that consume cloud services provided by cloud service provider network 320 and 324. Example endpoint devices include servers, smart phones, television set-top boxes, workstations, laptop/tablet computers, video gaming systems, teleconferencing systems, media players, and so forth.

Customer networks 308A-308B include respective provider edge/autonomous system border routers (PE/ASBRs) 310A-310B. Each of PE/ASBRs 310A, 310B may execute exterior gateway routing protocols to peer with one of PE routers 302A-302B ("PE routers 302" or more simply "PEs 302") over one of access links 316A-316B (collectively, "access links 316"). In the illustrated examples, each of access links 316 represents a transit link between an edge router of a customer network 308 and an edge router (or autonomous system border router) of cloud exchange point 303. For example, PE 310A and PE 302A may directly peer via an exterior gateway protocol, e.g., exterior BGP, to exchange L3 routes over access link 316A and to exchange L3 data traffic between customer network 308A and cloud service provider networks 320. Access links 316 may in some cases represent and alternatively be referred to as attachment circuits for IP-VPNs configured in IP/MPLS fabric 301, as described in further detail below. IP/MPLS fabric 301 is an example of a cloud exchange network. Access links 316 may in some cases each include a direct physical connection between at least one port of a customer network 308 and at least one port of cloud exchange point 303, with no intervening transit network. Access links 316 may operate over a VLAN or a stacked VLAN (e.g., QinQ), a VxLAN, an LSP, a GRE tunnel, or other type of tunnel.

While illustrated and primarily described with respect to L3 connectivity, PE routers 302 may additionally offer, via access links 316, L2 connectivity between customer networks 308 and cloud service provider networks 320 via dedicated virtual gateway 130. For example, a port of PE router 302A may be configured with an L2 interface that provides, to customer network 308A, L2 connectivity to cloud service provider 320A via access link 316A, with the cloud service provider 320A router 312A coupled to a port of PE router 304A that is also configured with an L2 interface. The port of PE router 302A may be additionally configured with an L3 interface that provides, to customer network 308A, L3 connectivity to cloud service provider 320B via access links 316A via the virtual gateway 130. PE 302A may be configured with multiple L2 and/or L3 sub-interfaces such that customer 308A may be provided, by the cloud exchange provider, with a one-to-many connection to multiple cloud service providers 320.

To create an L2 interconnection between a customer network 308 and a cloud service provider network 320, in some examples, IP/MPLS fabric 301 is configured with an L2 bridge domain (e.g., an L2 virtual private network (L2VPN) such as a virtual private LAN service (VPLS), E-LINE, or E-LAN) to bridge L2 traffic between a customer-facing port of PEs 302 and a CSP-facing port of cloud service providers 320. In some cases, a cloud service provider 320 and customer 308 may have access links to the same PE router 302, 304, which bridges the L2 traffic using the bridge domain.

To create an L3 interconnection between a customer network 308 and a cloud service provider network 320, in some examples, IP/MPLS fabric 301 is configured with L3 virtual routing and forwarding instances (VRFs), as described in further detail below with respect to FIG. 4. In some cases, IP/MPLS fabric 301 may be configured with an L3 instance that includes one or more VRFs, and the L3 instance may link multiple cloud service provider networks 320. In this case, a customer network 308 may not need to be interconnected or have any physical presence in the cloud exchange or data center.

Each of access links 316 and aggregation links 322 may include a network interface device (NID) that connects customer network 308 or cloud service provider 328 to a network link between the NID and one of PE routers 302, 304. Each of access links 316 and aggregation links 322 may represent or include any of a number of different types of links that provide L2 and/or L3 connectivity.

In this example, customer network 308C is not an autonomous system having an autonomous system number. Customer network 308C may represent an enterprise, network service provider, or other customer network that is within the routing footprint of the cloud exchange point. Customer network includes a customer edge (CE) device 311 that may execute exterior gateway routing protocols to peer with PE router 302B over access link 316C. In various examples, any of PEs 310A-310B may alternatively be or otherwise represent CE devices.

Access links 316 include physical links. PE/ASBRs 310A-310B, CE device 311, and PE routers 302A-302B exchange L2/L3 packets via access links 316. In this respect, access links 316 constitute transport links for cloud access via cloud exchange point 303. Cloud exchange point 303 may represent an example of any of cloud exchange points 128. Data center 300 may represent an example of data center 201.

Cloud exchange point 303, in some examples, aggregates customers 308 access to the cloud exchange point 303 and thence to any one or more cloud service providers 320. FIGS. 3A-3B, e.g., illustrate access links 316A-316B connecting respective customer networks 308A-308B to PE router 302A of cloud exchange point 303 and access link 316C connecting customer network 308C to PE router 302B. Any one or more of PE routers 302, 304 may comprise ASBRs. PE routers 302, 304 and IP/MPLS fabric 301 may be configured according to techniques described herein to interconnect any of access links 316 to any of cloud aggregation links 322. As a result, cloud service provider network 320A, e.g., needs only to have configured a single cloud aggregate link (here, access link 322A) in order to provide services to multiple customer networks 308. That is, the cloud service provider operating cloud service provider network 320A does not need to provision and configure separate service links from cloud service provider network 320A to each of PE routers 310, 311, for instance, in order to provide services to each of customer network 308. Cloud exchange point 303 may instead connect cloud aggregation link 322A and PE 312A of cloud service provider network 320A to multiple cloud access links 316 to provide layer 3 peering and network reachability for the cloud services delivery. In some examples, to provide interconnectivity between service provider networks 324 (and, in some examples, customer networks) connected to remove cloud exchange 326, PE routers 302, 304, 328 and IP/MPLS fabric 301 may be configured according to techniques described herein to interconnect any of access links 316 to exchange interconnect link 330.

In addition, a single customer network, e.g., customer network 308A, need only to have configured a single cloud access link (here, access link 316A) to the cloud exchange point 303 within data center 300 in order to obtain services from multiple cloud service provider networks 320 and 324 offering cloud services via the cloud exchange point 303. That is, the customer or network service provider operating customer network 308A does not need to provision and configure separate service links connecting customer network 308A to different PE routers 312 and 328, for instance, in order to obtain services from multiple cloud service provider networks 320 and 324. Cloud exchange point 303 may instead connect cloud access link 316A (again, as one example) to multiple cloud aggregate links 322 and/or exchange interconnect link 330 to provide layer 3 peering and network reachability for the cloud services delivery to customer network 308A via a dedicated virtual gateway 130. Traffic to and from cloud access link 316A (again, as one example) is routed via dedicated virtual gateway 130A.

Cloud service provider networks 320 each includes servers configured to provide one or more cloud services to users. These services may be categorized according to service types, which may include for examples, applications/software, platforms, infrastructure, virtualization, and servers and data storage. Example cloud services may include content/media delivery, cloud-based storage, cloud computing, online gaming, IT services, etc.

Cloud service provider networks 320 include PE routers 312A-312C that each executes an exterior gateway routing protocol, e.g., eBGP, to exchange routes with PE routers 304A-304B (collectively, "PE routers 304") of cloud exchange point 303. Each of cloud service provider networks 320 may represent a public, private, or hybrid cloud. Each of cloud service provider networks 320 may have an assigned autonomous system number or be part of the autonomous system footprint of cloud exchange point 303.

In the illustrated example, an Internet Protocol/Multiprotocol label switching (IP/MPLS) fabric 301 interconnects PEs 302 and PEs 304. IP/MPLS fabric 301 include one or more switching and routing devices, including PEs 302, 304, that provide IP/MPLS switching and routing of IP packets to form an IP backbone. In some example, IP/MPLS fabric 301 may implement one or more different tunneling protocols (i.e., other than MPLS) to route traffic among PE routers and/or associate the traffic with different IP-VPNs. In accordance with techniques described herein, IP/MPLS fabric 301 implement IP virtual private networks (IP-VPNs) to connect any of customers 308 with multiple cloud service provider networks 320 to provide a data center-based 'transport' and layer 3 connection.

Whereas service provider-based IP backbone networks require wide-area network (WAN) connections with limited bandwidth to transport service traffic from layer 3 services providers to customers, the cloud exchange point 303 as described herein 'transports' service traffic and connects cloud service providers 320 to customers 308 within the high-bandwidth local environment of data center 300 provided by a data center-based IP/MPLS fabric 301. In some examples, IP/MPLS fabric 301 implements IP-VPNs using techniques described in Rosen & Rekhter, "BGP/MPLS IP Virtual Private Networks (VPNs)," Request for Comments 4364, February 2006, Internet Engineering Task Force (IETF) Network Working Group, the entire contents of which is incorporated by reference herein. In some example configurations, a customer network 308 and cloud service provider network 320 may connect via respective links to the same PE router of IP/MPLS fabric 301.

Access links 316 and aggregation links 322 may include attachment circuits that associate traffic, exchanged with the connected customer network 308 or cloud service provider network 320, with virtual routing and forwarding instances (VRFs) configured in PEs 302, 304 and corresponding to IP-VPNs operating over IP/MPLS fabric 301. For example, PE 302A may exchange IP packets with PE 310A on a bidirectional label-switched path (LSP) operating over access link 316A, the LSP being an attachment circuit for a VRF configured in PE 302A. As another example, PE 304A may exchange IP packets with PE 312A on a bidirectional label-switched path (LSP) operating over access link 322A, the LSP being an attachment circuit for a VRF configured in PE 304A. Each VRF may include or represent a different routing and forwarding table with distinct routes.

PE routers 302, 304 of IP/MPLS fabric 301 may be configured in respective hub-and-spoke arrangements for cloud services, with PEs 304 implementing cloud service hubs and PEs 302 being configured as spokes of the hubs (for various hub-and-spoke instances/arrangements). A hub-and-spoke arrangement ensures that service traffic is enabled to flow between a hub PE and any of the spoke PEs, but not directly between different spoke PEs. As described further below, in a hub-and-spoke arrangement for data center-based IP/MPLS fabric 301 and for southbound service traffic (i.e., from a CSP to a customer) PEs 302 advertise routes, received from PEs 310, to PEs 304, which advertise the routes to PEs 312. For northbound service traffic (i.e., from a customer to a CSP), PEs 304 advertise routes, received from PEs 312, to PEs 302, which advertise the routes to PEs 310.

For some customers of cloud exchange point 303, the cloud exchange point 303 provider may configure a full mesh arrangement whereby a set of PEs 302, 304 each couple to a different customer site network for the customer. In such cases, the IP/MPLS fabric 301 implements a layer 3 VPN (L3VPN) for cage-to-cage or redundancy traffic (also known as east-west or horizontal traffic). The L3VPN may effectuate a closed user group whereby each customer site network can send traffic to one another but cannot send or receive traffic outside of the L3VPN.

PE routers may couple to one another according to a peer model without use of overlay networks. That is, PEs 310 and PEs 312 and 328 may not peer directly with one another to exchange routes, but rather indirectly exchange routes via IP/MPLS fabric 301. In the example of FIG. 3B, cloud exchange point 303 is configured to implement multiple layer 3 virtual connectors 332A-332C (collectively, "virtual connectors 332") to interconnect customer network 308 to a virtual gateway 130 dedicated to the customer and cloud service provider networks 322 with end-to-end IP paths. Dedicated virtual connectors 334A and 334B (collectively, "dedicated virtual connectors 334") are defined between cloud exchange point 303 and customer network 308 through dedicated virtual gateway 130. These virtual connectors 332 and 334 are configured such that all network traffic between customer network 308, cloud service provider networks 320, and remote cloud exchanges 328 are routed through dedicated virtual gateway 130. Each of cloud service providers 320 and virtual gateway 130 may be an endpoint for multiple virtual connectors 330, with multiple virtual connectors 330 traversing one or more attachment circuits between a PE/PE or PE/CE pair for the IP/MPLS fabric 301 and the CSP/customer. A virtual connector 330 represents a layer 3 path through IP/MPLS fabric 301 between virtual gateway 130 and an attachment circuit connecting a cloud service provider network to the fabric 301. Dedicated virtual connector 334 represent a path between virtual gateway 130 and access link 316 connecting customer network to fabric 301. Each virtual connector 330 may include at least one tunnel (e.g., an LSP and/or Generic Route Encapsulation (GRE) tunnel) having endpoints at PEs 302, 304. PEs 302, 304 may establish a full mesh of tunnels interconnecting one another.

Each virtual connector 330 may include a different hub-and-spoke network configured in IP/MPLS network 301 having PE routers 302, 304 exchanging routes using a full or partial mesh of border gateway protocol peering sessions, in this example a full mesh of Multiprotocol Interior Border Gateway Protocol (MP-iBGP) peering sessions. MP-iBGP or simply MP-BGP is an example of a protocol by which routers exchange labeled routes to implement MPLS-based VPNs. However, PEs 302, 304 may exchange routes to implement IP-VPNs using other techniques and/or protocols.

In the example of virtual connector 332A, PE router 312A of cloud service provider network 320A may send a route for cloud service provider network 320A to PE 304A via a routing protocol (e.g., eBGP) peering connection with PE 304A. PE 304A associates the route with a hub-and-spoke network, which may have an associated VRF, that includes spoke PE router 302A. PE 304A then exports the route to virtual gateway 130A operating on PE router 302A. Virtual gateway 130A may export the route specifying Virtual gateway 130A as the next hop router, along with a label identifying the hub-and-spoke network. Virtual gateway 130A sends the route to PE router 310B via a routing protocol connection with PE 310B. Virtual gateway 130A may send the route after adding an autonomous system number of the cloud exchange point 303 (e.g., to a BGP autonomous system path (AS_PATH) attribute) and specifying PE router 302A as the next hop router. Cloud exchange point 303 is thus an autonomous system "hop" in the path of the autonomous systems from customers 308 to cloud service providers 320 (and vice-versa), even though the cloud exchange point 303 may be based within a data center. PE router 310B installs the route to a routing database, such as a BGP routing information base (RIB) to provide layer 3 reachability to cloud service provider network 320A. In this way, cloud exchange point 303 "leaks" routes from cloud service provider networks 320 to customer networks 308, without cloud service provider networks 320 to customer networks 308 requiring a direct layer peering connection.

PE routers 310B, 302A, 304A, and 312A may perform a similar operation in the reverse direction to forward routes originated by customer network 308B to PE 312A and thus provide connectivity from cloud service provider network 320A to customer network 308B. In the example of virtual connectors 332B and 334A, PE routers 312B, 304A, and 310B and virtual gateway 130A exchange routes for customer network 308B and cloud service provider 320B in a manner similar to that described above for establishing virtual connectors 332B 334A. As a result, cloud exchange point 303 within data center 300 internalizes the peering connections that would otherwise be established between PE 310B and each of PEs 312A, 312B so as to perform cloud aggregation for multiple layer 3 cloud services provided by different cloud service provider networks 320A, 320B and deliver the multiple, aggregated layer 3 cloud services to a customer network 308B having a single access link 316B to the cloud exchange point 303.

In examples in which IP/MPLS fabric 301 implements BGP/MPLS IP VPNs or other IP-VPNs that use route targets to control route distribution within the IP backbone, PEs 304 may be configured to import routes from virtual gateways 130 of PEs 302 and to export routes received from PEs 312, using different asymmetric route targets. Likewise, virtual gateways 130 of PEs 302 may be configured to import routes from PEs 304 and to export routes received from PEs 310 using the asymmetric route targets. Thus, PEs 302, 304 may configured to implement advanced L3VPNs that each includes a basic backbone L3VPN of IP/MPLS fabric 301 together with extranets of any of customer networks 308 and any of cloud service provider networks 320 attached to the basic backbone L3VPN.

Each advanced L3VPN constitutes a cloud service delivery network from a cloud service provider network 320 to one or more customer networks 308, and vice-versa. In this way, cloud exchange point 303 enables any cloud service provider network 320 to exchange cloud service traffic with any customer network 308 while internalizing the layer 3 routing protocol peering connections that would otherwise be established between pairs of customer networks 308 and cloud service provider networks 320 for any cloud service connection between a given pair. In other words, the cloud exchange point 303 allows each of customer networks 308 and cloud service provider networks 320 to establish a single (or more for redundancy or other reasons) layer 3 routing protocol peering connection to the data center-based layer 3 connect. By filtering routes from cloud service provider networks 320 to customer networks 308, and vice-versa, PEs 302, 304 thereby control the establishment of virtual connectors 330 and the flow of associated cloud service traffic between customer networks 308 and cloud service provider networks 320 within a data center 300. Routes distributed into MP-iBGP mesh 318 may be VPN-IPv4 routes and be associated with route distinguishers to distinguish routes from different sites having overlapping address spaces.

Programmable network platform 120 may receive service requests for creating, reading, updating, and/or deleting end-to-end services of the cloud exchange point 303. In response, programmable network platform 120 may configure virtual gateways 130 of PEs 302 and may configure PEs 304 and/or other network infrastructure of IP/MPLS fabric 301 to provision or obtain performance or other operations information regarding the service. Operations for provisioning a service and performed by programmable network platform 120 may include configuring or updating VRFs, installing SDN forwarding information, configuring LSPs or other tunnels, configuring BGP, configuring access links 316 and aggregation links 322, or otherwise modifying the configuration of the IP/MPLS fabric 301. Other operations may include making service requests to an orchestration system for cloud service provider networks 320, as described in further detail below.

Figure 4:
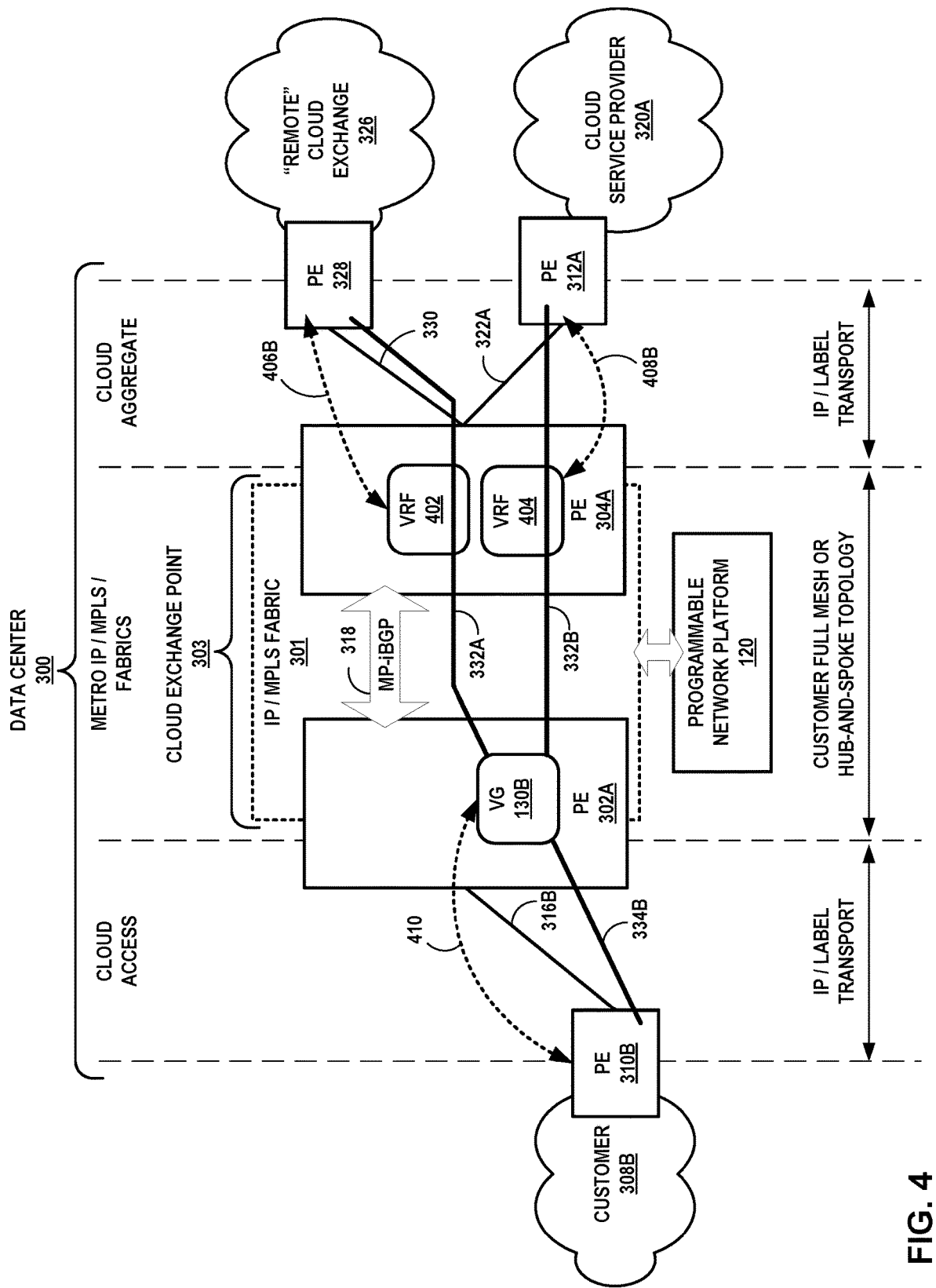
FIG. 4 is a block diagram illustrating an example of a data center-based cloud exchange point in which routers of the cloud exchange point are configured by programmable network platform with virtual gateways for routing and forwarding aggregated service traffic among multiple cloud service provider networks and a customer network, according to techniques described herein.

FIG. 4 is a block diagram illustrating an example of a data center-based cloud exchange point in which routers of the cloud exchange point are configured by programmable network platform 120 with VPN routing and forwarding instances for routing and forwarding aggregated service traffic from multiple cloud service provider networks to a customer network, according to techniques described herein. In this example, to establish virtual connectors 332A-332B, PE router 302A is configured with virtual gateway 103 and PE routers 304A are configured with VRFs 402 and 404. VRFs 402 and 404 are configured to import routes exported by virtual gateway 130. The configuration may include asymmetric route targets for import/export between VRFs 402 and 404 and virtual gateway 130. This configuration whereby a customer can access multiple layer 3 services from different CSPs each associated with separate VRFs to access the layer 3 services provides isolation of respective traffic exchanged with the CSPs. As noted above with respect to FIGS. 3A-3B, PE routers 302, 304 may be further configured to bridge layer 2 traffic between customer 308B and cloud service providers 320.

In this example, PE router 304A operates BGP or other route distribution protocol peering connections 406B, 408B with respective PE routers 312A, 312B to exchange routes with respective cloud service provider networks 320A, 320B. PE router 302A operates a BGP or other route distribution protocol peering connection 410 with PE router 310B to exchange routes with customer network 308B. In some examples, PE routers 302A, 304A may be statically configured with routes for the site networks.

An administrator or a programmable network platform described herein for cloud exchange point 303 may configure PE routers 302A with virtual gateway 130 and PE router 304A with the VRF 402 and 404 in order to leak routes between PE routers 312 and PE router 310B and facilitate layer 3 connectivity for end-to-end IP paths illustrated here by virtual connectors 332 and 334, while potentially optimizing the end-to-end IP paths by fostering data center-based or at least metro-based connectivity. Cloud exchange point 303 may thus provide dedicated cloud service provider access to customer network 308B by way of private and/or public routes for the cloud service provider networks 320. In the northbound direction, cloud exchange point 303 may provide dedicated cloud service provider distribution to multiple customer networks 308 by way of private and/or public routes for the customer networks 308. Neither PE router 310B nor any of PE routers 302A, 304A need access to the full Internet BGP routing table to reach cloud service provider networks 320 or customer networks 308. Moreover, PE routers 302A, 304A may be configured to aggregate customer/CSP routes and/or service traffic based on any one or more of physical, IP, service, and VRFs.

Figure 5:
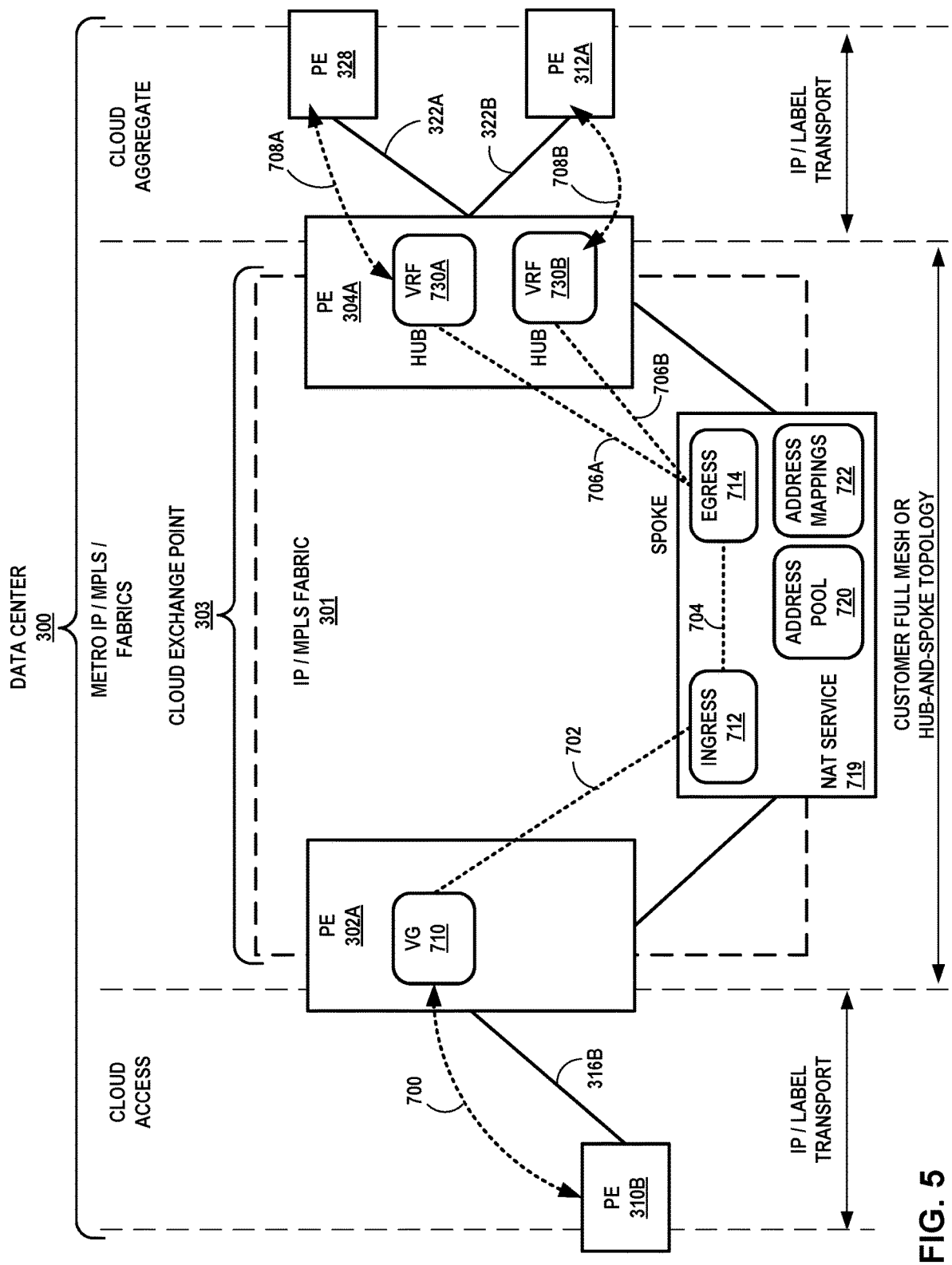
FIG. 5 is a block diagram illustrating an example of a data center-based cloud exchange point in which a cloud exchange point is configured to apply network address translation and to route and forward aggregated service traffic among multiple cloud service provider networks and a customer network via a virtual gateway, according to techniques described herein.

FIG. 5 is a block diagram illustrating an example of a data center-based cloud exchange point in which a cloud exchange point is configured to apply network address translation and to route and forward aggregated service traffic from multiple cloud service provider networks to a customer network, according to techniques described herein.

Cloud service provider networks 320, remote cloud exchange networks 326, and customer networks 308 are not shown in FIG. 5 for ease of illustration purposes. In these examples, the data center-based cloud exchange point 303 applies a network address translation (NAT) service 719 to, in part, enforce network address separation between the cloud service layer accessible via cloud aggregation links 322 and the cloud access layer accessible via cloud access links 316.

A cloud exchange point 303 NAT device(s) that applies NAT service 719 performs NAT (or NAPT), which may also or alternatively include carrier-grade NAT ("CG-NAT" or "CGN"), to translate the cloud exchange point 303 addresses and CSP routes and/or to translate the cloud exchange point 303 addresses and customer routes. The cloud exchange point 303 NAT device(s) that applies NAT service 719 (also referred to herein as "NAT service 719 device") may include one or more dedicated NAT appliances, one or more virtual machines executing on real server(s) and configured to apply NAT using network function virtualization (NFV), one or more service cards configured to apply the NAT service 719 and inserted in one or more of PEs 302, 304, or other device(s) inbox or out-of-box.

NAT service 719 of FIG. 5 may be implemented in one or more NAT service devices. In FIG. 5, the NAT service 719 is associated with an address pool 720 that is configured with routes for the cloud exchange point 303 autonomous system and from which the NAT service 719 may draw to automatically provision and map, for NAT purposes, to customer and/or cloud service provider routes received via peering sessions 700 and 708A-708B, respectively. The network addresses for configured routes in address pool 720 (or "NAT pool 720") may be public, private, or a combination thereof, and may represent IPv4 and/or IPv6 routes. In some examples, the network addresses are public in order to provide global uniqueness for the network addresses.

Address mappings 722 may specify one or more NAT mappings and/or network address and port translations (NAPT) that associate routes from address pool 720 for the cloud exchange point 303 with routes received by the cloud exchange point 303 routers from any of PEs 310, 312. Routes received from any of PEs 310, 312 for translation and used in end-to-end service delivery may include any IP addresses/prefixes from enterprise/NSP customers of the cloud exchange provider, such addresses including private and/or public IPv4 and/or IPv6 addresses and received at any one or more of the cloud exchange points managed by the cloud exchange provider.

As noted above, NAT service 719 may perform NAT to translate customer routes for customer network 308B (not shown in FIG. 5) and cloud exchange point 303 routes advertised to PEs 312A, 328 for aggregated cloud access. As a result, CSP networks 320 (not shown in FIG. 5) receive the cloud exchange point 303 routes drawn from address pool 720 instead of the customer routes. The cloud exchange point 303 is thus able to filter customer network information from the CSPs, and the CSPs receive cloud exchange point 303 routes associated with a single autonomous system (i.e., the cloud exchange point 303 and one ASN per cloud exchange point) rather than customer routes (which could potentially number in the millions) associated with multiple different autonomous systems (and corresponding ASNs, which could potentially number in the hundreds) for various customers (enterprises and/or NSPs).

Further, because the cloud exchange point 303 does not advertise its routes other than to customers and CSPs, the cloud exchange point 303 does not announce its routes to the Internet, which may improve security and reduce the potential for Denial of Service (DoS) or other malicious activity directed to the cloud exchange point 303 and customers/CSPs with which the cloud exchange point 303 has peering relationships. In addition, the techniques described above may simplify end-to-end cloud service delivery processing and improve performance by ensuring that local traffic is processed locally (within the cloud exchange point 303).

In the illustrated example, NAT service 719 is associated with ingress service VRF 712 ("ingress 712") and egress service VRF 714 ("egress 714") for attracting service traffic that is associated with customer network 308B and that is to be NATted. Ingress 712 and egress 714 constitute part of a customer service chain for cloud service traffic between customer network 308B and CSP networks 320A, 320B. Dedicated virtual gateway 710 associated customer network 308B receives routes from customer PE 310B via peering session 700. Dedicated virtual gateway 710 may be configured in a VPN-full mesh relationship with ingress service VRFs distributed in the cloud exchange point 303 (only one peering session 702 is illustrated, however).

In some examples, PE 302A distributes, for dedicated virtual gateway 710, customer routes received via peering session 700 to the NAT service 719, which dynamically maps the customer route prefixes to cloud exchange point route prefixes drawn from address pool 720. The customer routes are installed to ingress service VRF 712. The NAT service 719 installs the mappings to address mappings 722 and installs, to egress service VRF 714, cloud exchange point routes that specify the cloud exchange point route prefixes and NAT service 719 as the next hop. In this way, NAT service 719 and more specifically egress service VRF 714 attracts downstream traffic from CSP network 320 that is intended for the customer network 308B but destined for the cloud exchange point routes installed to egress service VRF 714. Ingress service VRF 712 and egress service VRF 714 may establish peering session 704 and be configured with route targets to cause VRFs 712, 714 to leak routes to one another via iBGP, for instance.

Egress service VRF 714 may operate as a spoke VRF for corresponding hub VRFRs 730A, 730B in a manner similar to dedicated virtual gateway 710 of PE 302A operating in the example of FIG. 4. That is, egress service VRF 714 and VRFs 730A, 730B are configured with reciprocal route targets such that egress service VRF 714 advertises routes for the egress service VRF 714 for installation to VRFs 730A, 730B, while VRFs 730A, 730B advertise routes for corresponding CSP networks 320A and remote cloud exchange 326 to egress service VRF 714. NATted upstream service traffic destined to any of CSP networks 320A and remote cloud exchange 326 passes through corresponding hub VRFs 730A, 730B. Each of peering sessions 706A, 706B may be used in this way to create hub-and-spoke VPNs for the respective CSP networks 320A, 320B.

PEs 302, 304 may establish tunnels with the NAT service 719 device. Routes exchanged via peering sessions 702 and 706A, 706B may include labeled routes for implementing MPLS/BGP IP-VPNs according to RFC 4364, incorporated above.

Cloud exchange point 303 may forward and apply NAT service 719 to downstream service traffic from PE 312A, intended for customer network 308A, as follows. PE 304A receives a service packet on aggregation link 322A. The packet has a destination address that is a cloud exchange point 303 address drawn from address pool 720. VRF 730A associated with aggregation link 322A stores a route for the destination address that specifies an address for the NAT service 719 device, and PE 304A tunnels the packet using VRF 730A to the NAT service 719 device for application of the NAT service.

NAT service 719 uses address mappings 722 dynamically provisioned for routes for customer network 308A and received from PE 302A to perform NAT and replace the service packet destination address with a destination address in customer network 308A. The NAT service 719 device may determine in ingress service VRF 712 the labeled route to PE 302A (the label identifying dedicated virtual gateway 710) and tunnel the modified service packet PE 302A, which may identify dedicated virtual gateway 710 from the label attached to the modified service packet. PE 302A forwards the modified service packet to PE 310B via access link 316B. In this way, cloud exchange point 303 provides a NAT service to the customer to separate the customer from the cloud service layer. In a similar way, the cloud exchange point 303 may apply NAT to upstream traffic to separate cloud service providers from the cloud or network access layer by which customer networks access the cloud exchange point.

Figure 6:
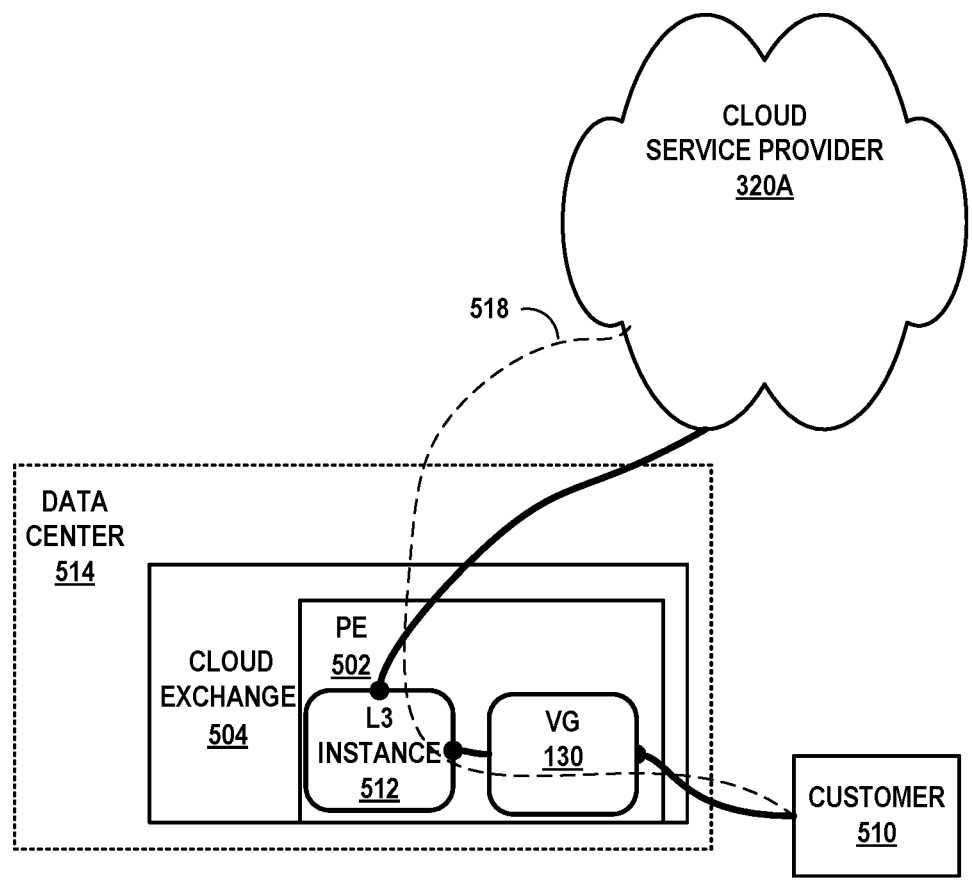
FIG. 6 is a block diagram illustrating an example use case in accordance with one or more aspects of the techniques of this disclosure

FIG. 6 is a block diagram illustrating an example use case in accordance with one or more aspects of the techniques of this disclosure. The techniques of this disclosure may allow SaaS and/or PaaS providers currently hosted within other public IaaS providers to become sellers on the cloud exchange 504. In this example, a service provider purchases L3 instance 512 within cloud exchange 504 and becomes a seller in cloud exchange 504. Customer 510 can purchase services (e.g., data storage and/or data analytics services) from the service provide via cloud exchange 504. On the backend, in some examples the service provider can use a direct connect service offered by CSP 320A to transmit the data of customer 510, via dedicated virtual gateway 130, back to its main compute services running in CSP 320A. Thus, customer 510 does not need to have a relationship with CSP 320 in order to have a relationship with the service provider. This facilitates SaaS providers operating on a third-party IaaS (here, CSP 320A).

The underlying CSP connectivity to CSP 320A may be "chained" to L3 instance 512 owned by the service provider. L3 instance 512 allows cloud exchange 504 to be configured to support the service provider. In some examples, cloud exchange 504 may be configured to terminate a service profile to a physical port belonging to an entity other than the owner of the service profile, if the master owner of the service port has been designated as a CSP host. The hosted service provider provides information about their environment and the systems of cloud exchange 504 can validate against this information. In this way, using the L3 instance 512 can allow additional physical ports and Letter of Agreement (LOA) from a provider other than owner of the port. For example, when a service provider residing on CSP 320A wants a port, cloud exchange 504 delivers a port to facilities of CSP 320A and the LOA to the service provider.

In some examples, utilization and reporting for the service provider is limited to only those services terminating to service provider, or their virtual port channel (VPC) in the case of being provisioned on the same port. In some examples, the owner of the master port may set limits on the master port, e.g., limits as to how much sold bandwidth the service provider may use. CSP 320A may be considered a "reseller" of cloud exchange assets (e.g., a physical port or virtual port channel), and CSP 320A may have control over asset-based permissions management using techniques described in U.S. patent application Ser. No. 15/414,697, filed Jan. 25, 2017, entitled "ASSET-BASED PERMISSIONS MANAGEMENT FOR RESELLERS OF CLOUD EXCHANGE ASSETS," the entire contents of which are incorporated by reference herein.

L3 instance 512 may represent a VRF configured by a PE (e.g., the PE associated with CSP 320A) to establish virtual connectors between the service provider and virtual gateway 130 of customer 510. The service provider is connected to customer 510 by end-to-end L3 connections 518 through L3 instance 512 and dedicated virtual gateway 130. In some examples, connections 518 may be virtual connectors as described above.

Figure 7:
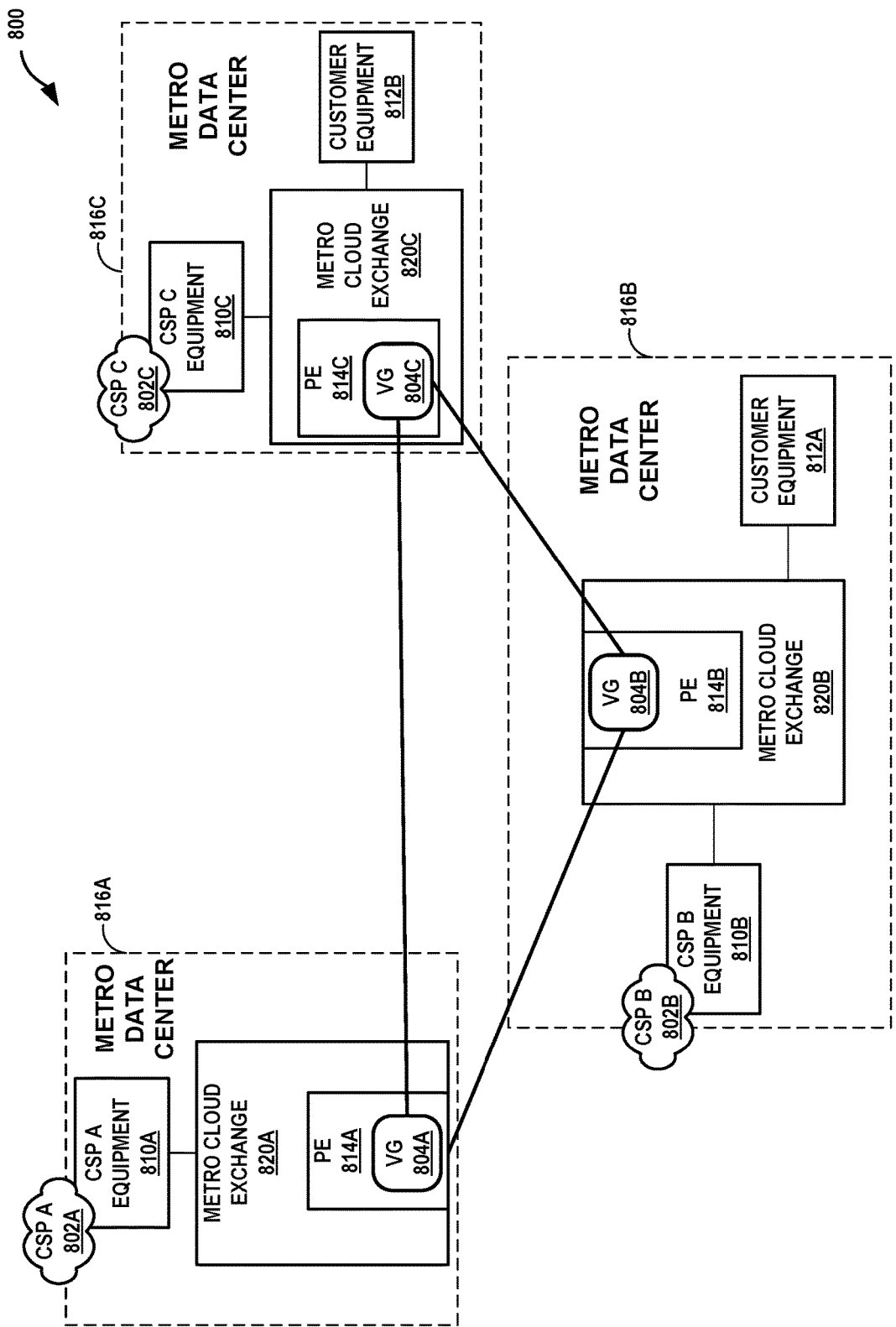
FIG. 7 is a block diagram illustrating an example system in which CSPs and customers are spread across multiple metropolitan area data centers with traffic at and between the data centers being managed in an aggregated manner, according to techniques described herein.

FIG. 7 is a block diagram illustrating an example system 800 in which cloud service providers (e.g., CSPs 802A-802C) have a presence in one or more metropolitan area data centers 816A-816C. The metro data centers 816A-816C may be geographically separate from each other. For example, metro data center 816A may be located in Chicago, while metro data center 816B may be located in Dallas. Metro data centers 816A-816C are interconnected.

In the example of FIG. 7, CSP A 802A has CSP A equipment 810A (e.g., a rack co-located in a data center operated by a cloud exchange provider) physically located in metro data center 816A. CSP B 802B has CSP B equipment 810B (e.g., a rack co-located in a data center operated by a cloud exchange provider) physically located in metro data center 816B. Additionally, CSP C 802C has CSP C equipment 810C (e.g., a rack co-located in a data center operated by a cloud exchange provider) physically located in metro data center 816C. Additionally, in the illustrated example, the customer has customer equipment 812A (e.g., a rack co-located in a data center operated by a cloud exchange provider) in metro data center B 816B and customer equipment 812B in metro data center B 816B.

The customer may subscribe to CSPs 802A-802C that are connected at different metro data centers 816A-816C to be accessed by customer networks via customer equipment 812A and 812B that are connected at different metro data centers 816A-816C. When a customer subscribes to a CSP 802A-802C in a metro data center 816A-816C, the corresponding metro cloud exchange 820A-820C configures a dedicated virtual gateway 804A-804C in the respective PE routers 814A-814C through which traffic related to that customer in transit through the metro cloud exchange 820A-802C flows. For example, when a customer subscribes to CSP B 802B, metro cloud exchange 820B configures dedicated virtual gateway 804B. When a customer subscribes to a CSP 802A-802C located at another metro data center 816A-816C, dedicated virtual gateways 804-804C automatically exchange routes. Intra-cloud exchange traffic (e.g., network traffic between CSP B equipment 810B and customer equipment 812A, etc.) and inter-exchange traffic (e.g., network traffic between metro cloud exchange 820A and metro cloud exchange 820B, etc.) to that customer is routed through dedicated virtual gateway 804A. For example, when traffic from customer equipment 812A is destined for CSPC equipment 810C, the network traffic is routed through dedicated virtual gateway 814C and dedicated virtual gateway 814C. That is, CSP C 802C can establish an end-to-end connection 822 between CSP C equipment 810C in metro data center 816C and customer equipment 812A in metro area B data center 816B by establishing a virtual connector with dedicated virtual gateway 804C in metro cloud exchange 820C.

Dedicated virtual gateways 814A-814C monitor and manage network traffic the metro cloud exchanges 820A-820C. Customers license bi-directional traffic per metro data center 816A-816C. This licensed traffic defines the maximum bandwidth, i.e., rate, that can be routed through the dedicated virtual gateway(s) 804A-804C at the metro data center 816A-816C and therefore defines a total amount of licensed bandwidth available to the customer for all of its services. This bi-directional traffic subscription includes inter-exchange network traffic and intra-exchange network traffic. For example, a license for metro data center 816A may define the maximum bandwidth to be 2 Gbps. Generally, when a customer subscribes to a cloud service provider, the subscription includes a cloud service traffic license. For example, the license for CSP A 802A may define the maximum bandwidth as 500 Mbps.

Dedicated virtual gateways 814A-814B police network traffic for the customer to ensure that the traffic between dedicated virtual gateways 814A-814B (e.g., the inter-exchange network traffic) and traffic to and from the cloud service providers 802A-802C does not exceed the bandwidth limits of the customer's subscriptions. This provides a single interface for the customer to monitor and manage bandwidth usage across all of the customer's subscriptions. For example, network traffic through dedicated virtual gateway 804C may include network traffic between CSP C equipment 810C and customer equipment 812B, network traffic between dedicated virtual gateway 804C and dedicated virtual gateway 804A, and network traffic between dedicated virtual gateway 804C and dedicated virtual gateway 804B. For example, if customer subscription to metro area C data center 816C is 1 Gbps and network traffic between dedicated virtual gateway 804C and dedicated virtual gateway 804A is 200 Mbps, local traffic (e.g., intra-exchange traffic) at metro area C data center 816C may be capped at 800 Mbps. As traffic demand changes with changes in inter-exchange traffic and intra-exchange traffic, dedicated virtual gateways 804A-804C dynamically shape traffic to comply with the customer's subscriptions.

In some examples, dedicated virtual gateways 804A-804C may use destination-based rate limiting using destination class usage (DCU). DCU counts packets from customers by performing lookups of the destination address. DCU makes it possible to track traffic originating from the customer and destined for specific cloud service providers. This facilitates, for example, traffic shaping such that traffic destined for a cloud service provider (e.g., CSP 802A-802C, etc.) does not exceed the customer's subscription and risk being dropped by the cloud service provider. By policing the aggregate traffic to the customer's destinations, dedicated virtual gateway can ensure that the bandwidth of the aggregate traffic does not exceed the customer's licensed bandwidth.

For example, the programmable network platform for cloud exchanges 820 may map respective Border Gateway Protocol communities for CSP network 802C, advertised by VG 804C, to a single policer for VG 804A and then configure, in 804A of PE 814A, the single policer with a remote bandwidth limit that is based on an aggregate bandwidth subscription for the customer that limits the bandwidth between VG 804A and VG 804C.

This per-data center subscription and network traffic management using dedicated virtual gateways 804A-804C simplifies subscription management as compared to per virtual link subscription and network traffic management. For example, instead of managing subscriptions and network traffic for (i) a virtual connector between customer equipment 812A and CSP B equipment 810B, (ii) a virtual connector between customer equipment 812A and CSP A equipment 810A, (iii) a virtual connector between customer equipment 812A and CSP B equipment 810C (iv) a virtual connector between customer equipment 812B and CSP B equipment 810B, (v) a virtual connector between customer equipment 812B and CSP A equipment 810A, (vi) a virtual connector between customer equipment 812B and CSP B equipment 810C, (vii) a virtual connector between CSP A equipment 810A and CSP B equipment 810B, (viii) a virtual connector between CSP A equipment 810A and CSP C equipment 810C, and (ix) a virtual connector between CSP B equipment 810B and CSP C equipment 810C, the dedicated virtual gateways 804A-804C facilitate managing subscriptions and network traffic for (i) a metro A subscription, (ii) a metro B subscription, (iii) a metro C subscription, (iv) a CSP A subscription, (v) a CSP B subscription, and (vi) a CSP C subscription. Additionally, for example, if the customer were to subscribe to an additional CSP at metro area A data center 816, only one additional subscription would have to be configured at dedicated virtual gateway 804A.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random-access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A system comprising:
   a first cloud exchange network for a first cloud exchange, the first cloud exchange network located within a first data center and configured with a first dedicated virtual gateway, the first dedicated virtual gateway configured to interface with a first virtual connector to a customer network, with a second virtual connector to a first cloud service provider network, and with a third virtual connector to a second cloud service provider network, wherein network traffic among the customer network, the first cloud service provider network, and the second cloud service provider network is routed through the first dedicated virtual gateway; and
   a programmable network platform comprising processing circuitry and configured to:
   obtain an aggregate bandwidth for an aggregate bandwidth subscription defining a total bandwidth for network traffic associated with the first cloud exchange network, the network traffic associated with the first cloud exchange network including network traffic between the customer network and the first cloud service provider network and network traffic between the customer network and the second cloud service provider network;
   obtain a local bandwidth for network traffic forwarded by the first dedicated virtual gateway to networks colocated in the first data center;
   set a remote bandwidth limit for network traffic forwarded by the first dedicated virtual gateway to a second dedicated virtual gateway based on a difference between the aggregate bandwidth and the local bandwidth; and
   configure a policer of the first dedicated virtual gateway with the remote bandwidth limit to cause the first dedicated virtual gateway to limit a remote bandwidth for network traffic forwarded to the second dedicated virtual gateway,
   wherein the first dedicated virtual gateway uses destination class usage (DCU) to track traffic originating from the customer network and destined to the first cloud service provider network and to the second cloud service provider network,
   wherein the first dedicated virtual gateway aggregates the traffic originating from the customer network and destined to the first cloud service provider network and the second cloud service provider network to determine an aggregated traffic for the customer network that is exchanged between the first dedicated virtual gateway and the first cloud service provider network and between the first dedicated virtual gateway and the second cloud service provider network,
   wherein the first dedicated virtual gateway uses the policer to perform destination-based rate limiting to shape the aggregated traffic associated with the traffic originating from the customer network and destined to the first cloud service provider network and to the second cloud service provider based on the aggregate bandwidth subscription, and
   wherein the first dedicated virtual gateway uses the policer to police, based on the remote bandwidth limit, network traffic between the first dedicated virtual gateway and the second dedicated virtual gateway.

2. The system of claim 1, further comprising:
   a second cloud exchange network for a second cloud exchange, the second cloud exchange network located within a second data center geographically remote from the first data center, wherein the first dedicated virtual gateway includes a fourth virtual connector to the second dedicated virtual gateway configured on the second cloud exchange network.

3. The system of claim 1, wherein the first dedicated virtual gateway dynamically polices, based on the aggregate bandwidth subscription, network traffic by limiting for the network traffic associated with the first cloud exchange network, the network traffic associated with the first cloud exchange network further including network traffic between the first dedicated virtual gateway and the second dedicated virtual gateway.

4. The system of claim 1, wherein the first dedicated virtual gateway exchanges routes with the second dedicated virtual gateway.

5. The system of claim 1, further comprising:
   a second cloud exchange network for a second cloud exchange, the second cloud exchange network located within a second data center geographically remote from the first data center, wherein the first dedicated virtual gateway is configured to dynamically shape network traffic over the first cloud exchange network based on inter-exchange traffic between the first dedicated virtual gateway and the second dedicated virtual gateway operating in the second cloud exchange network.

6. The system of claim 1, further comprising:
   a second cloud exchange network for a second cloud exchange, the second cloud exchange network located within a second data center geographically remote from the first data center, wherein when the customer network is subscribed to a third cloud service provider connected to the second cloud exchange network, the first dedicated virtual gateway automatically establishes a fourth virtual connector with the second dedicated virtual gateway configured on the second cloud exchange network.

7. The system of claim 1,
   wherein the first dedicated virtual gateway performs destination-based rate limiting such that network traffic is rate-limited to a set of one or more destinations, and
   wherein to track the traffic originating from the customer network and destined to the first cloud service provider network and to the second cloud service provider network, the first dedicated virtual gateway monitors network traffic from the customer network by performing lookups of a destination address of network traffic destined for at least one of the first cloud service provider network or the second cloud service provider network.

8. The system of claim 7, wherein the first dedicated virtual gateway is configured, based on the destination-based rate limiting, with a first policer to shape network traffic between the first dedicated virtual gateway and the first cloud service provider network and a second policer to shape network traffic between the first dedicated virtual gateway and the customer network.

9. A system comprising:
   a first cloud exchange network of a first cloud exchange, the first cloud exchange network located within a first data center and configured with a first dedicated virtual gateway;
   a second cloud exchange network of a second cloud exchange, the second cloud exchange network located within a second data center geographically remote from the first data center, and configured with a second dedicated virtual gateway; and a programmable network platform comprising processing circuitry and configured to:

obtain an aggregate bandwidth for an aggregate bandwidth subscription defining a total bandwidth for network traffic associated with the first cloud exchange network;

obtain a local bandwidth for network traffic forwarded by the first dedicated virtual gateway to networks colocated in the first data center;

set a remote bandwidth limit for network traffic forwarded by the first dedicated virtual gateway to the second dedicated virtual gateway based on a difference between the aggregate bandwidth and the local bandwidth; and configure a policer of the first dedicated virtual gateway with the remote bandwidth limit to cause the first dedicated virtual gateway to limit a remote bandwidth for network traffic forwarded to the second dedicated virtual gateway, wherein the first dedicated virtual gateway is configured to:

track, using destination class usage (DCU), traffic originating from a customer network and destined to a first cloud service provider network and to a second cloud service provider network, aggregate the traffic originating from the customer network and destined to the first cloud service provider network and the second cloud service provider network to determine an aggregated traffic for the customer network that is exchanged between the first dedicated virtual gateway and the first cloud service provider network and between the first dedicated virtual gateway and the second cloud service provider network, shape, using the policer performing destination-based rate limiting, the aggregated traffic associated with the traffic originating from the customer network and destined to the first cloud service provider network and to the second cloud service provider based on the aggregate bandwidth subscription, and police, by the policer based on the remote bandwidth limit, network traffic between the first dedicated virtual gateway and the second dedicated virtual gateway.

10. The system of claim 9, wherein the programmable network platform is configured to:

map respective Border Gateway Protocol communities for one or more networks, advertised by the second dedicated virtual gateway, to the policer for the first dedicated virtual gateway.

11. A method comprising:

configuring, by a programmable network platform, a first dedicated virtual gateway in a first cloud exchange network to interface with a first virtual connector to a customer network, with a second virtual connector to a first cloud service provider network, and with a third virtual connector to a second cloud service provider network, wherein network traffic among the customer network, the first cloud service provider network, and the second cloud service provider network is routed through the first dedicated virtual gateway;

obtaining, by the programmable network platform, an aggregate bandwidth for an aggregate bandwidth subscription defining a total bandwidth for network traffic associated with the first cloud exchange network, the network traffic associated with the first cloud exchange network including network traffic between the customer network and the first cloud service provider network and network traffic between the customer network and the second cloud service provider network;

obtaining, by the programmable network platform, a local bandwidth for network traffic forwarded by the first dedicated virtual gateway to networks colocated in a data center with the first cloud exchange network;

setting, by the programmable network platform, a remote bandwidth limit for network traffic forwarded by the first dedicated virtual gateway to a second dedicated virtual gateway based on a difference between the aggregate bandwidth and the local bandwidth;

configuring, by the programmable network platform, a policer of the first dedicated virtual gateway with the remote bandwidth limit to cause the first dedicated virtual gateway to limit a remote bandwidth for network traffic forwarded to the second dedicated virtual gateway;

tracking, by the first dedicated virtual gateway using destination class usage (DCU), traffic originating from the customer network and destined to the first cloud service provider network and to the second cloud service provider network;

aggregating, by the first dedicated virtual gateway, the traffic originating from the customer network and destined to the first cloud service provider network and the second cloud service provider network to determine an aggregated traffic for the customer network that is exchanged between the first dedicated virtual gateway and the first cloud service provider network and between the first dedicated virtual gateway and the second cloud service provider network;

shaping, by the first dedicated virtual gateway using the policer, the aggregated traffic associated with the traffic originating from the customer network and destined to the first cloud service provider network and to the second cloud service provider based on the aggregate bandwidth subscription; and policing, by the first dedicated virtual gateway using the policer, based on the remote bandwidth limit, network traffic between the first dedicated virtual gateway and the second dedicated virtual gateway.

12. The method of claim 11, wherein the first dedicated virtual gateway includes a fourth virtual connector to the second dedicated virtual gateway configured on a second cloud exchange network of a second cloud exchange, the second cloud exchange network located within a second data center geographically remote from the first data center.

13. The method of claim 11, further comprising: dynamically policing, based on the aggregate bandwidth subscription, network traffic by limiting the total bandwidth for the network traffic associated with the first cloud exchange network, the network traffic associated with the first cloud exchange network further including network traffic between the first dedicated virtual gateway and the second dedicated virtual gateway.

14. The method of claim 11, further comprising:

receiving, by the first dedicated virtual gateway, routes from the second dedicated virtual gateway that indicate networks reachable via the second dedicated virtual gateway.

15. The method of claim 11, further comprising:

configuring, by the programmable network platform, the first dedicated virtual gateway with a first policer to perform destination-based rate limiting to shape network traffic between the first dedicated virtual gateway and the first cloud service provider network and a second policer to perform destination-based rate limiting to shape network traffic between the first dedicated virtual gateway and the customer network.

16. The method of claim 11, further comprising:

configuring, by the programmable network platform, the first dedicated virtual gateway to dynamically shape network traffic over the first cloud exchange network based on inter-exchange traffic between the first dedicated virtual gateway and the second dedicated virtual gateway operating in a second cloud exchange network.

* * * * *